(12) United States Patent
Kuznetsov et al.

(10) Patent No.: US 10,809,430 B2
(45) Date of Patent: Oct. 20, 2020

(54) POLARIZATION DEVICE FOR POLARIZING ELECTROMAGNETIC WAVES, METHODS OF FORMING AND OPERATING THE SAME

(71) Applicant: Agency for Science, Technology and Research, Singapore (SG)

(72) Inventors: Arseniy Kuznetsov, Singapore (SG); Ramon Jose Paniagua Dominguez, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 268 days.

(21) Appl. No.: 16/071,454

(22) PCT Filed: Dec. 15, 2016

(86) PCT No.: PCT/SG2016/050607
§ 371 (c)(1),
(2) Date: Jul. 19, 2018

(87) PCT Pub. No.: WO2017/131581
PCT Pub. Date: Aug. 3, 2017

(65) Prior Publication Data
US 2019/0018176 A1 Jan. 17, 2019

(30) Foreign Application Priority Data
Jan. 29, 2016 (SG) .............. 10201600698S

(51) Int. Cl.
*G02B 5/30* (2006.01)
*G02B 27/28* (2006.01)
(Continued)

(52) U.S. Cl.
CPC .............. *G02B 5/3025* (2013.01); *G02B 1/11* (2013.01); *G02B 5/1809* (2013.01); *G02B 5/30* (2013.01); *G02B 5/3008* (2013.01); *G02B 27/283* (2013.01)

(58) Field of Classification Search
None
See application file for complete search history.

(56) References Cited

U.S. PATENT DOCUMENTS 3,813,265 A * 5/1974 Marks ................. G02B 5/3033
427/473
2006/0262398 A1* 11/2006 Sangu ................. G02B 5/3058
359/485.05
(Continued)

OTHER PUBLICATIONS

International Preliminary Report on Patentability for International Application No. PCT/SG2016/050607 dated Nov. 27, 2017, pp. 1-18.
(Continued)

*Primary Examiner* — Derek S. Chapel
(74) *Attorney, Agent, or Firm* — Winstead PC

(57) ABSTRACT

Various embodiments may provide a polarization device for polarizing electromagnetic waves. The polarization device may include a stacked arrangement including a medium and an anti-reflection coating in contact with the medium. The polarization device may also include a periodic array of polarization elements in contact with the medium. The polarization device may be configured to, based on an electric response and a magnetic response of the periodic array of the polarization elements, transmit first polarized electromagnetic waves having a first polarization and reflect second polarized electromagnetic waves having a second polarization upon receiving the electromagnetic waves.

20 Claims, 40 Drawing Sheets

(51) Int. Cl.
*G02B 5/18* (2006.01)
*G02B 1/11* (2015.01)

(56) References Cited

U.S. PATENT DOCUMENTS

| | | |
|---|---|---|
| 2007/0297053 A1 | 12/2007 | Wang |
| 2008/0055724 A1 | 3/2008 | Bluem et al. |
| 2008/0198302 A1 | 8/2008 | Cho |
| 2013/0208332 A1* | 8/2013 | Yu .................... G02B 1/002 359/240 |
| 2014/0085693 A1* | 3/2014 | Mosallaei ............. G02F 1/19 359/107 |
| 2014/0366647 A1* | 12/2014 | Steinhardt ............. G01K 17/00 73/862.381 |
| 2016/0156090 A1* | 6/2016 | Campione ............. G02B 1/002 333/219.1 |

OTHER PUBLICATIONS

Kuznetsov et al., "Magnetic Light," Scientific Reports, vol. 2, No. 492, Jul. 2012, pp. 1-6.

Evlyukhin et al., "Optical Response Features of Si-Nanoparticle Arrays," Physical Review B, vol. 82, No. 045404, 2010, pp. 1-12.
Garcia-Etxarri et al., "Strong Magnetic Response of Submicron Silicon Particles in the Infrared," Optics Express, vol. 19, No. 6, Mar. 14, 2011, pp. 4815-4826.
Nieto-Vesperinas et al., "Angle-Suppressed Scattering and Optical Forces on Submicrometer Dielectric Particles," J. Opt. Soc. Am. A, vol. 28, No. 1, Jan. 2011, pp. 54-60.
Fu et al., "Directional Visible Light Scattering by Silicon Nanoparticles," Nature Communications, vol. 4, No. 1527, Feb. 26, 2013, pp. 1-6.
Paniagua-Dominguez et al., "Generalized Brewster Effect in Dielectric Metasurfaces," Nature Communications, vol. 7, No. 10362, Jan. 19, 2016, pp. 1-9.
Moitra et al., "Experimental Demonstration of a Broadband All-Dielectric Metamaterial Perfect Reflector," Applied Physics Letters, vol. 104, No. 171102, 2014, pp. 1-5.
Moitra et al., "Large-Scale All-Dielectric Metamaterial Perfect Reflectors," ACS Photonics, vol. 2, 2015, pp. 692-698.
Luk'yanchuk et al., "Optimum Forward Light Scattering by Spherical and Spheroidal Dielectric Nanoparticles with High Refractive Index," ACS Photonics, vol. 2, 2015, pp. 993-999.

* cited by examiner

Arrange a polarization device
to receive the electromagnetic
waves

Determine polarization elements of the polarization device based on a wavelength range of interest

402

Determine the wavelength at which the magnetic dipole resonance occurs, and the wavelength at which the electric dipole resonance occurs which are required to polarize the electromagnetic waves

404

Scaling the polarization elements proportionally until the wavelength at which the magnetic dipole resonance occurs, and the wavelength at which the electric dipole resonance occurs are within the wavelength range of interest

| Technology (example) / Property | birefringent prisms based (calcite) | Non-birefringent prisms based (SF2 glass) | Thin film (BK7 glass) | Isolated particle Based (spheroidal silver particles) | Wire grid Based (metallic wires) | New technology |
|---|---|---|---|---|---|---|
| Intensity of desired polarization (in %) | ~90% | ~90-100% | ~70-80% | 50-90% | 70 – 90% | ~100% |
| Extinction ratio (ER) | $10^5$:1 | ~1000:1 | 100-10000:1 | Up to $10^8$:1 | ~1000-10000:1 | $10^6$:1 |
| Thickness | mm | mm | ~mm | 100's nm-μm | μm | 100's nm |
| Broad-band | Yes (microns) | Yes (microns) | Yes (~micron) | Yes (microns but limited to 10's-100's nm for high ER) | Yes (microns in IR, 100's nm in VIS) | Yes (100's nm width limited to 10's nm for high ER) |
| Polarizing beam-splitter | Yes | Yes | Yes (special coatings needed) | No | Yes (with mm-sized prisms) | Yes |
| Damage threshold (cw) | ~MW/$cm^2$ | ~MW/$cm^2$ | ~kW/$cm^2$ | 1-10 W/$cm^2$ | - | - |
| Short Pulse | No | No | Yes | Yes | Yes | Yes |
| Polarization design | No | No | No | No | Yes | Yes |
| Angle design | No | No | No | No | No | Yes |
| Wavelength design | No | No | No | Yes | Yes | Yes |

FIG. 5B
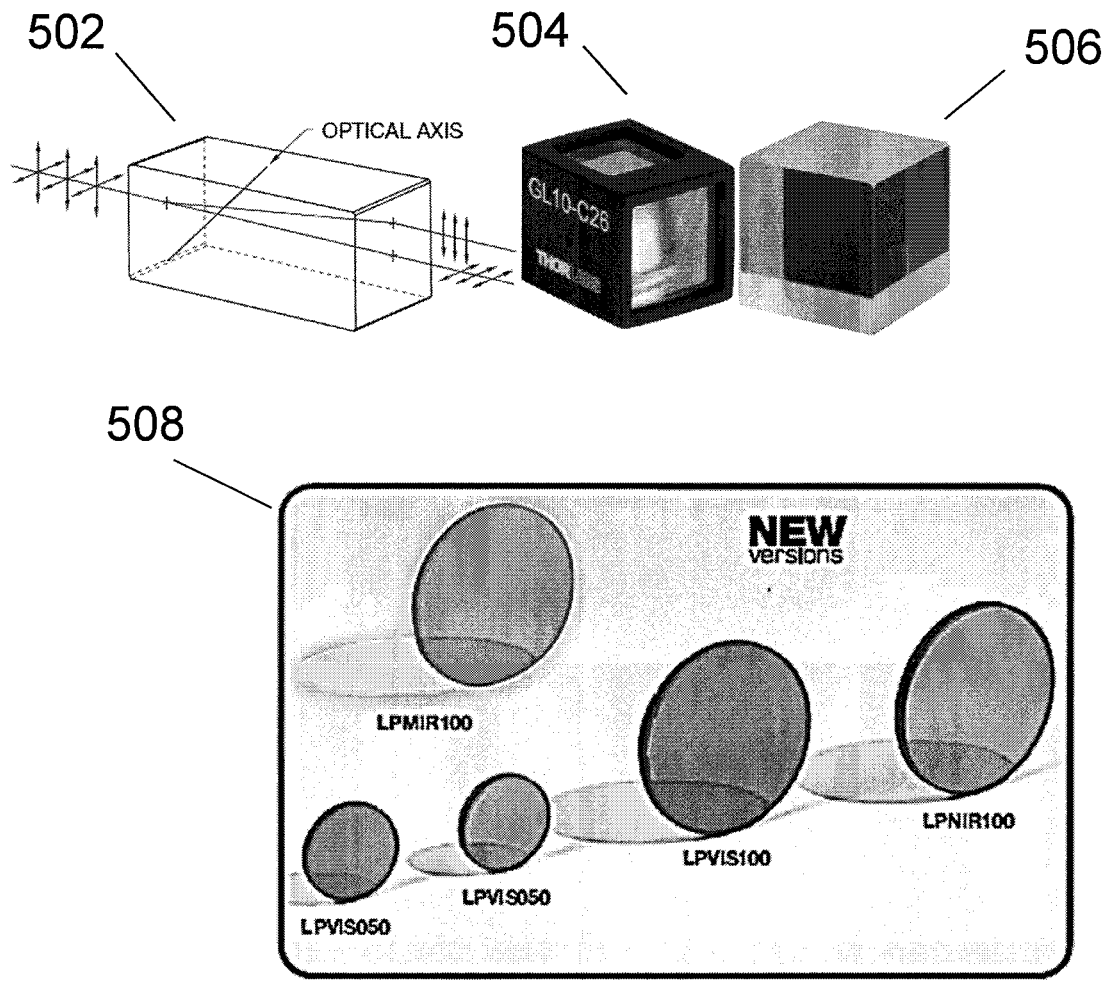
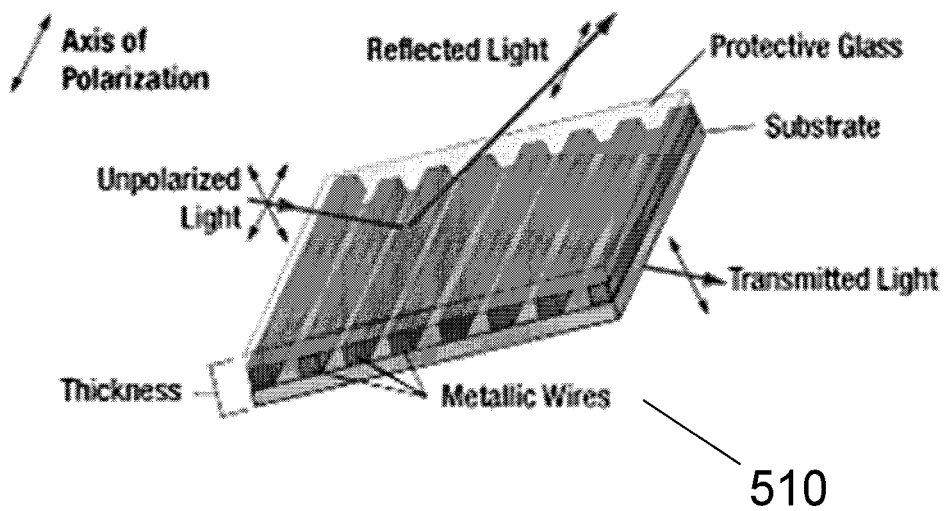

| Gaussian pulse centered at 810 nm (data for transmitted pulse) | | |
|---|---|---|
| | Pulse duration (Input) | Pulse duration (Output) |
| This technology | 20 fs | 20.5 fs |
| ½" prism polarizing beam-splitter ($SiO_2$) | 20 fs | 65 fs |

1100a

1100b

1200b

POLARIZATION DEVICE FOR POLARIZING ELECTROMAGNETIC WAVES, METHODS OF FORMING AND OPERATING THE SAME

CROSS-REFERENCE TO RELATED APPLICATION

This application claims the benefit of priority of Singapore application No. 10201600698S filed on Jan. 29, 2016, the contents of it being hereby incorporated by reference in its entirety for all purposes.

TECHNICAL FIELD

Various aspects of this disclosure relate to polarization devices and/or arrangements for polarizing electromagnetic waves. Various aspects of this disclosure relate to methods of forming and/or operating polarization devices and/or arrangements for polarizing electromagnetic waves.

BACKGROUND

Commercial polarizers and polarizing beam-splitters may be divided into two large categories. The first class may be referred to as non-particle based devices and the second as particle based devices. Whether a polarizer or a polarizing beam-splitter is in the first class or the second class depends on whether it uses properties of bulk and continuous media in combination with a particular geometry (typically one or more prisms), or it makes use of the scattering properties of arrangements of particles (typically objects with a characteristic size comparable to the operating wavelength and which composition and geometry are designed to obtain the desired scattering response).

Common examples of the former include all calcite-based polarizing elements such as beam displacing prisms, the Glan-Taylor (single and double) polarizers, the Glan-Thomson prism polarizers, the Rochon prism polarizers, and the Wollaston prism polarizers as well as the thin film polarizers. Representative examples of particle-based polarizers are those based on isolated particles, such as silver nanoparticle inclusions (typically of ellipsoidal shape), or those based on arrays of wires or grooves, typically made of metals or low-index dielectrics such as Barium, Calcium Fluoride or Zinc Selenide, which may also be referred to as wire grid polarizers.

Non-particle based polarizers and polarizing beam-splitters typically have broad bandwidth and good figures-of-merit in terms of transmission of desired polarization and extinction ratio (defined as the ratio of maximum transmission when polarization is aligned to the transmission axis to the minimum transmission for the perpendicular polarization). The transmission and extinction ratio are regarded as amongst the best for this kind of optical components. However, they come together with a considerable thickness, typically of tens of millimeters, which limits their applicability in certain situations, such as situations in which compactness or small optical paths are required (e.g., with ultra-short optical pulses).

The exception is thin film polarizers, which may be sub-millimeters thick. However, the performance of thin film polarizers in terms of extinction ratio is notably reduced.

Non-particle based polarizers and polarizing beam-splitters operate based on the electric polarizability of the material, which is a consequence of the electric response of bound electrons to the incident field. As the electric response is typically rather small and requires long optical paths, their applicability may be limited, such as when short pulses are required due to the strong associated dispersion or when compactness of the device is important, although they typically have high efficiencies and high damage thresholds.

On the other hand, particle-based polarizers can be made rather thin, as their response to light is governed by the strong electrical response of the particles comprised in the polarizers. The particles are typically sub-wavelength-sized structured metals. One type of such devices works by absorbing the undesired polarization component, which usually translates into a simultaneous reduction in transmission of the desired polarization. The absorption ultimately generates heating of the devices which results in significant lower damage thresholds. Other particle-based devices may work by reflecting the unwanted polarization (generating a polarized transmitted beam), which often results in a fraction of the desired polarization being reflected as well, limiting their applicability as beam splitters. In those cases, additional non-particle based elements may be required.

SUMMARY

Various embodiments may provide a polarization device for polarizing electromagnetic waves. The polarization device may include a stacked arrangement including a medium and an anti-reflection coating in contact with the medium. The polarization device may also include a periodic array of polarization elements in contact with the medium. The polarization device may be configured to, based on an electric response and a magnetic response of the periodic array of the polarization elements, transmit first polarized electromagnetic waves having a first polarization and reflect second polarized electromagnetic waves having a second polarization upon receiving the electromagnetic waves.

Various embodiments may provide a method of forming device for polarizing electromagnetic waves. The method may include forming a stacked arrangement including a medium and an anti-reflection coating in contact with the medium. The method may also include forming a periodic array of polarization elements in contact with the medium. The polarization device may be configured to, based on an electric response and a magnetic response of the periodic array of the polarization elements, transmit first polarized electromagnetic waves having a first polarization and to reflect second polarized electromagnetic waves having a second polarization upon receiving the electromagnetic waves.

Various embodiments may provide a method of operating a polarization device for polarizing electromagnetic waves. The method may include arranging a polarization device to receive the electromagnetic waves. The polarization device may further include The polarization device may further include a stacked arrangement including a medium and an anti-reflection coating in contact with the medium. The polarization device may also include a periodic array of polarization elements in contact with the medium. The polarization device may be configured to, based on an electric response and a magnetic response of the periodic array of the polarization elements, transmit first polarized electromagnetic waves having a first polarization and to reflect second polarized electromagnetic waves having a second polarization upon receiving the electromagnetic waves.

BRIEF DESCRIPTION OF THE DRAWINGS

The invention will be better understood with reference to the detailed description when considered in conjunction with the non-limiting examples and the accompanying drawings, in which:

FIG. 3 is a schematic showing a method of operating a polarization device for polarizing electromagnetic waves according to various embodiments.

FIG. 4 is a schematic showing a method of designing or configuring the polarization device according to various embodiments.

FIG. 5A is a table comparing the various parameters of the polarization device according to one embodiment with conventional devices.

FIG. 5B shows the conventional devices illustrating in table. The conventional devices include birefringent prisms (calcite), non-birefringent prisms (SF$_2$ glass), thin films (BK7 glass), isolated particle based prisms (spheroidal silver particles), and wire grid based prisms (metallic wires).

FIG. 9D is a table comparing the transmitted pulse durations of a polarization device according to various embodiments and the commercial fused silica based polarizing beam splitter cube.

DETAILED DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

Figure 1A:
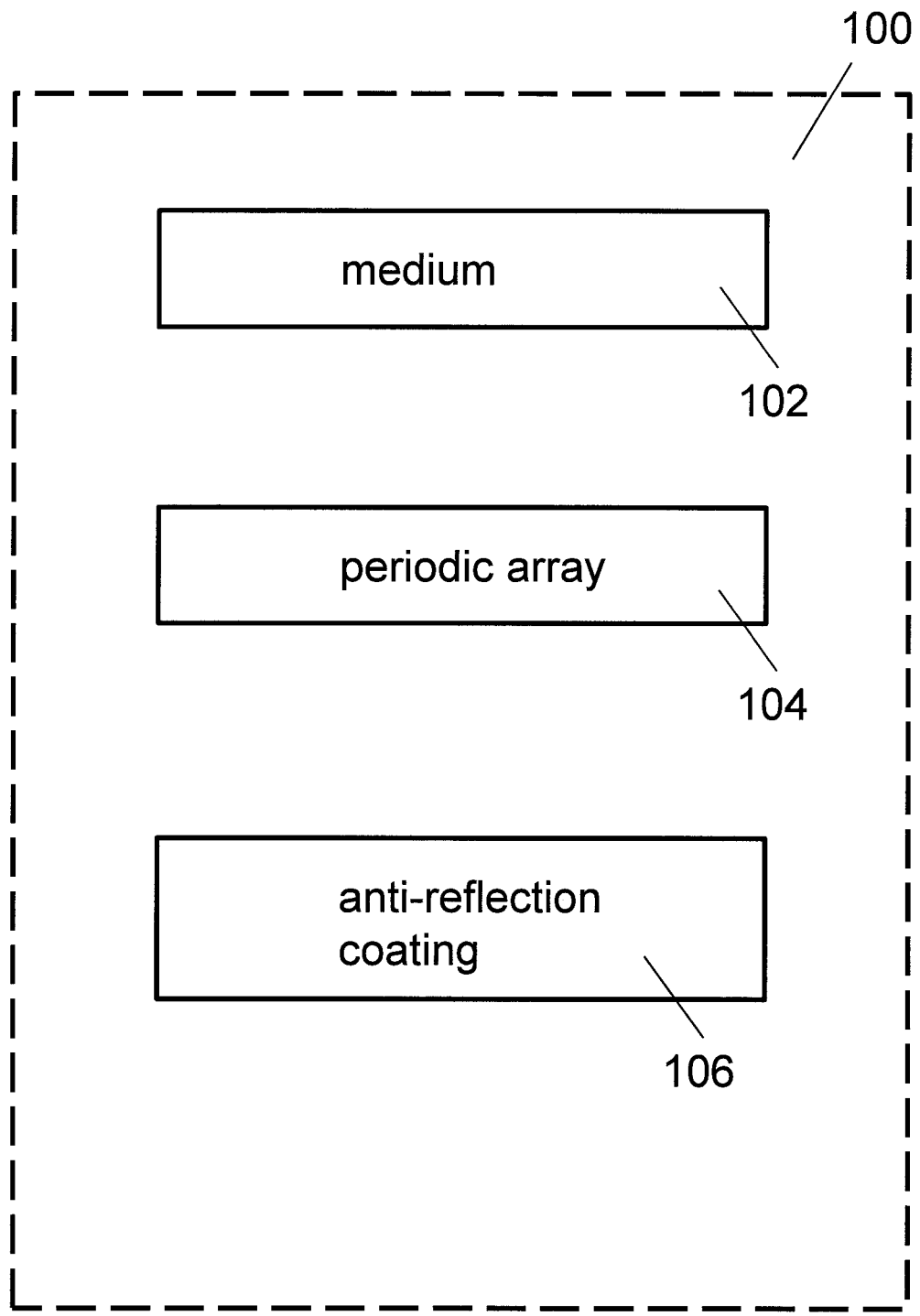
FIG. 1A is a schematic providing a general illustration of a polarization device according to various embodiments for polarizing electromagnetic waves.

FIG. 1A is a schematic providing a general illustration of a polarization device 100 according to various embodiments for polarizing electromagnetic waves. The polarization device 100 may include a stacked arrangement including a medium 102 and an anti-reflection coating 106 in contact with the medium 102. The polarization device 100 may also include a periodic array 104 of polarization elements in contact with the medium 102. The polarization device 100 may be configured to, based on an electric response and a magnetic response of the periodic array 104 of the polarization elements 104a, 104b etc., transmit first polarized electromagnetic waves having a first polarization and reflect second polarized electromagnetic waves having a second polarization upon receiving the electromagnetic waves.

In other words, the polarization device 100 may upon receiving electromagnetic waves, transmit electromagnetic waves having a first polarization, and reflect electromagnetic waves having a second polarization, thereby polarizing the electromagnetic waves. The polarization device 100 may include a medium 102. The polarization device 100 may further include an anti-reflection coating 106, and an ordered array 104 of polarization elements in contact with the medium 102.

Various embodiments may provide an improved device 100 for polarizing electromagnetic waves, such as optical light. Various embodiments may involve magnetic response of the polarization elements in addition to the electric response.

In various embodiments, the polarization device 100 may be a polarizer. In various other embodiments, the polarization device 100 may be a polarizing beam splitter.

Figure 1B:
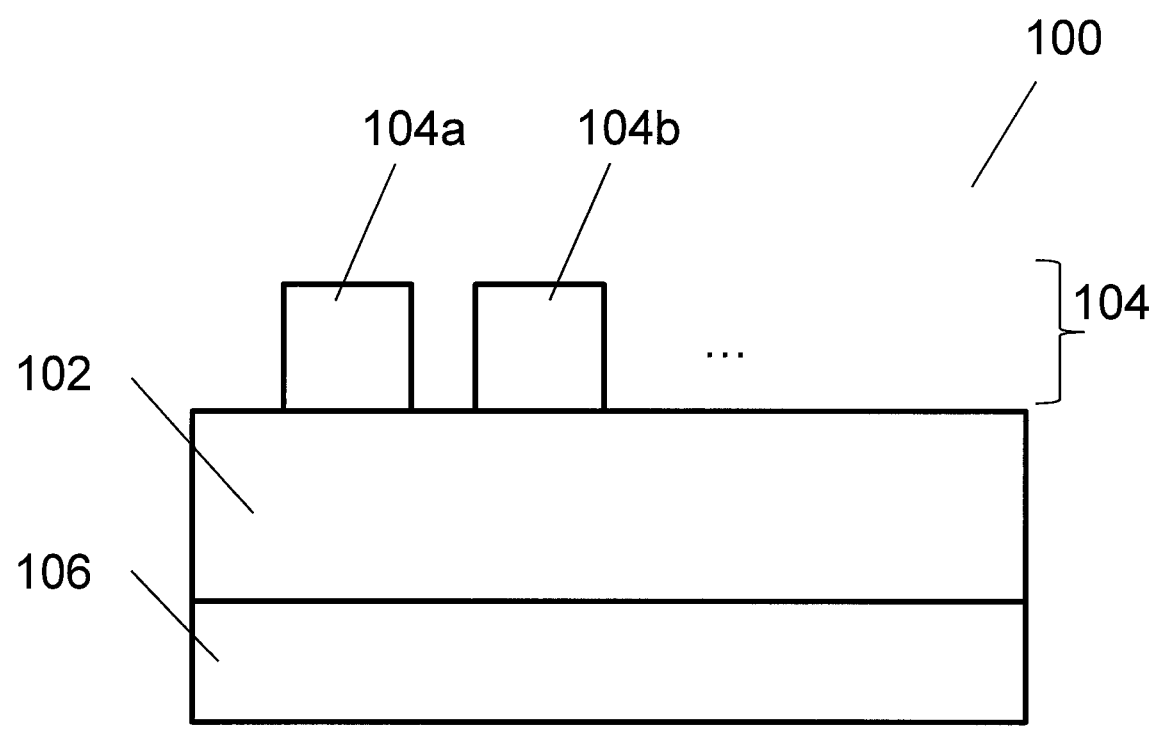
FIG. 1B is a schematic of the polarization device according to various embodiments for polarizing electromagnetic waves.

In various embodiments, the medium 102 may be a substrate. FIG. 1B is a schematic of the polarization device 100 according to various embodiments for polarizing electromagnetic waves. The periodic array 104 of polarization elements 104a, 104b etc. may be on a first surface of the substrate 102, and the anti-reflection coating may be on a second surface of the substrate 102 opposite the first surface.

Figure 1C:
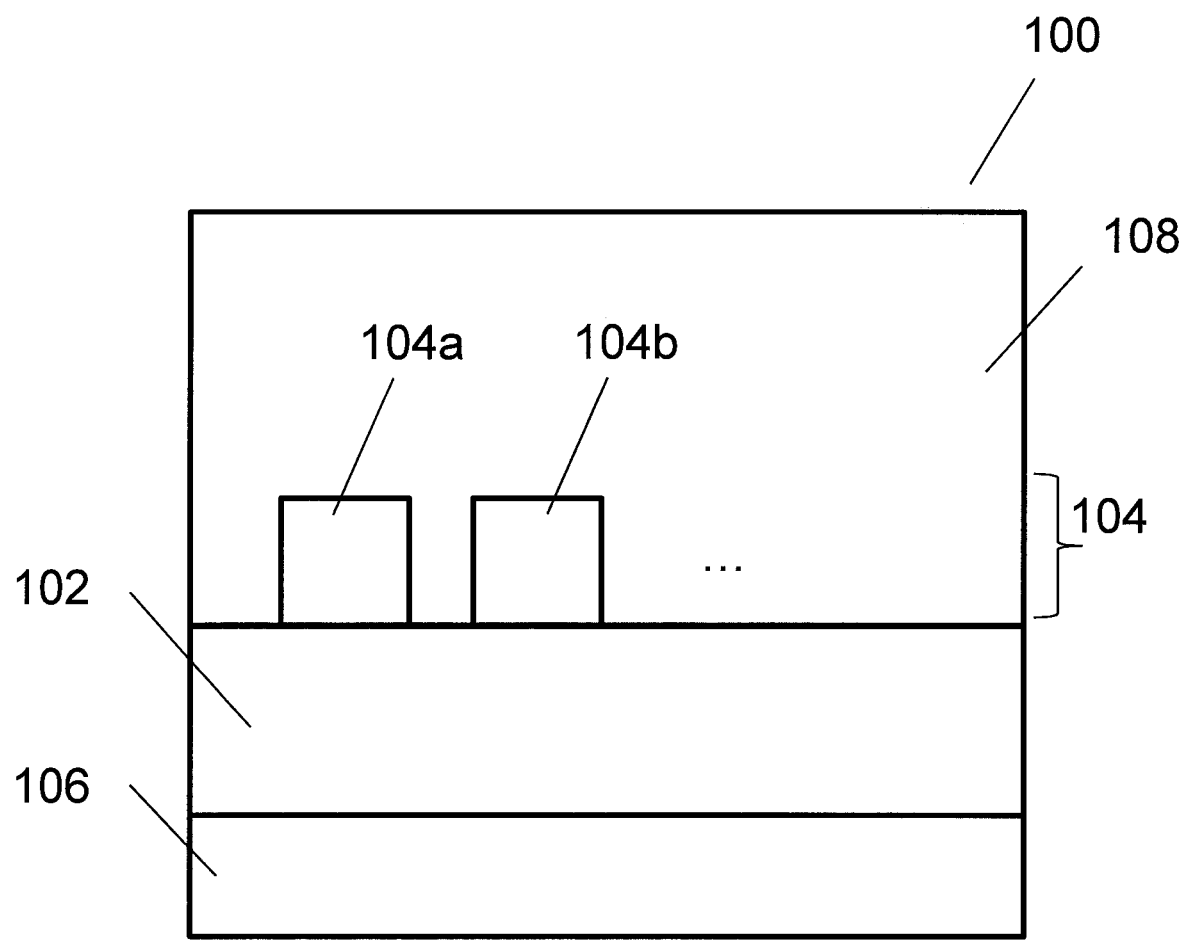
FIG. 1C is a schematic of the polarization device according to various other embodiments for polarizing electromagnetic waves.

FIG. 1C is a schematic of the polarization device 100 according to various other embodiments for polarizing electromagnetic waves. The polarization device 100 may further include a cover layer 108 at least partially covering the periodic array of polarization elements 104a, 104b etc. The polarization elements 104a, 104b etc. may be at least partially embedded in the cover layer 108. The cover layer may have a refractive index that is substantially equal to a refractive index of the substrate 102. As shown in FIG. 1C, the antireflection coating 106 and the cover layer 108 may be on opposing surfaces of the substrate 102.

Figure 1D:
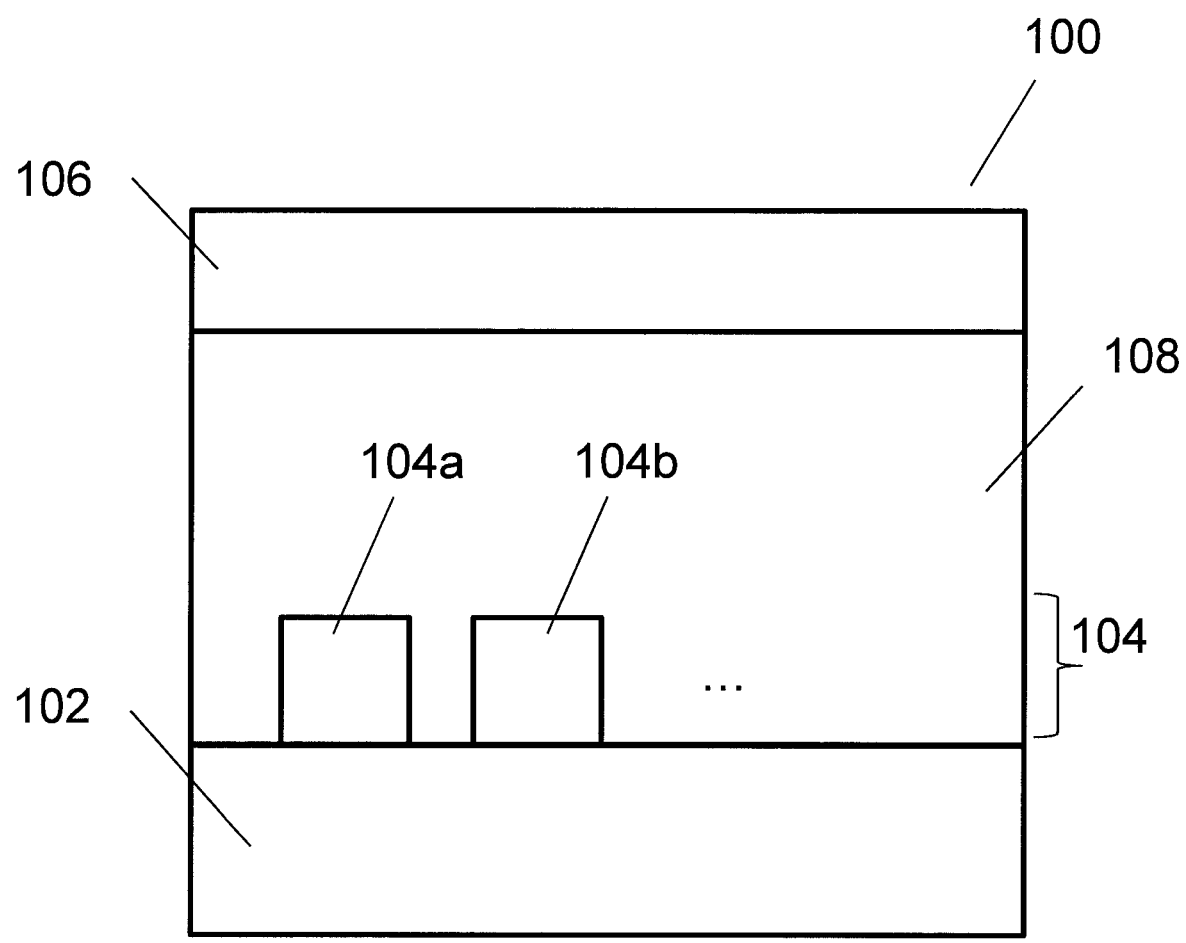
FIG. 1D is a schematic of the polarization device according to various other embodiments for polarizing electromagnetic waves.

FIG. 1D is a schematic of the polarization device 100 according to various other embodiments for polarizing electromagnetic waves. The substrate 102 and the antireflection coating 106 may be on opposing surfaces of the cover layer 108.

Figure 1E:
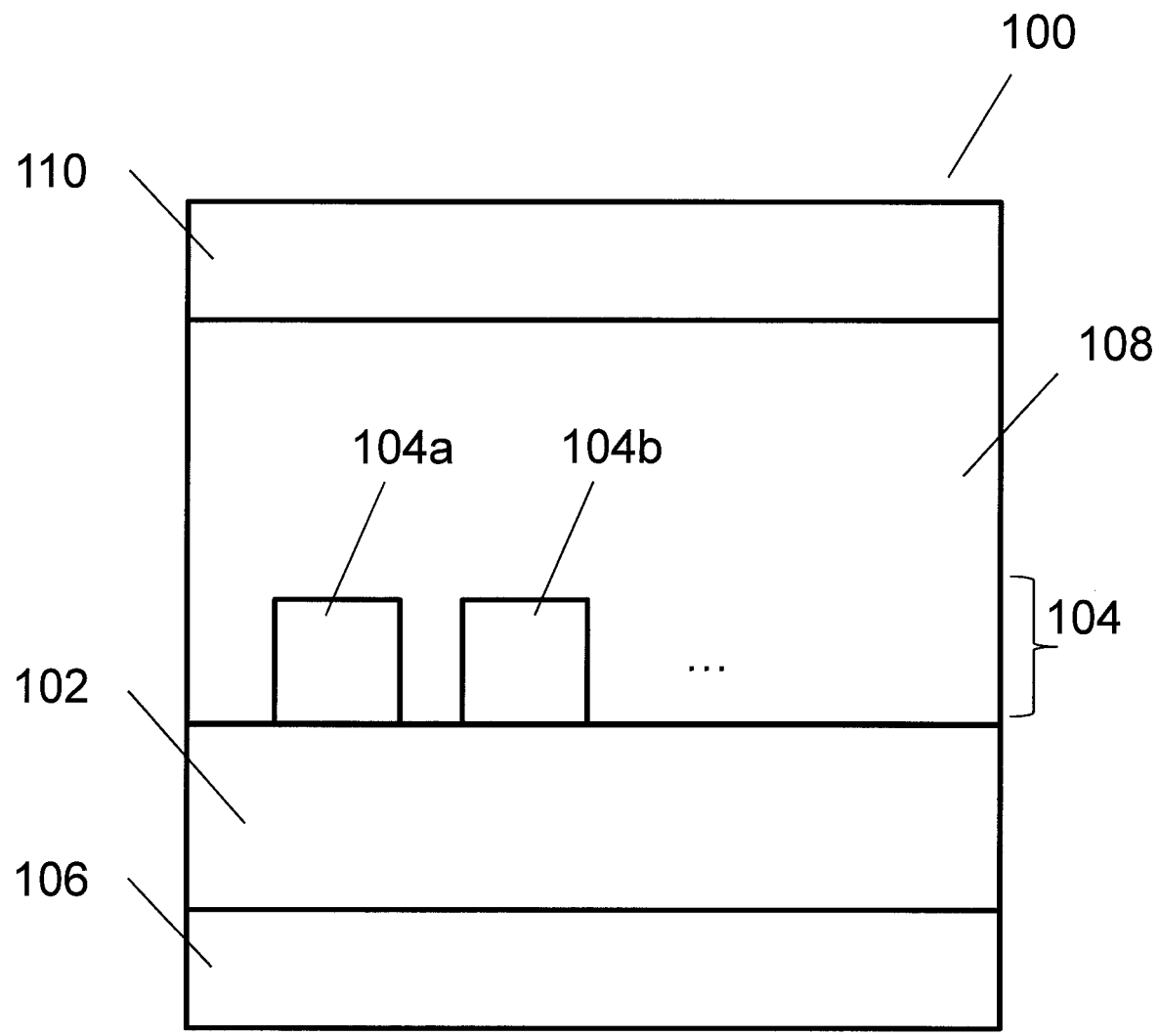
FIG. 1E is a schematic of the polarization device according to various other embodiments for polarizing electromagnetic waves.

FIG. 1E is a schematic of the polarization device 100 according to various other embodiments for polarizing electromagnetic waves. The polarization device 100 may further include a further anti-reflection coating 110 on the cover layer 108. The anti-reflection coating 106 and the cover layer 108 may be on opposing surfaces of the substrate 102.

Figure 1F:
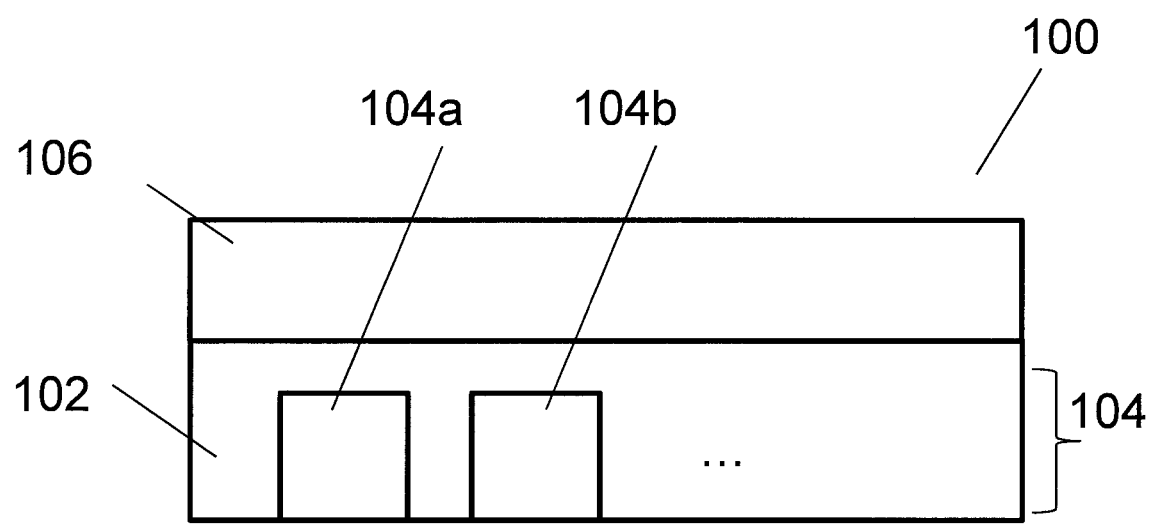
FIG. 1F is a schematic of the polarization device according to various other embodiments for polarizing electromagnetic waves.

FIG. 1F is a schematic of the polarization device 100 according to various other embodiments for polarizing electromagnetic waves. In various embodiments, the medium 102 may instead be a superstrate or a cover layer. The antireflection coating 106 may be on the superstrate or cover layer 102.

In various embodiments, a refractive index of the substrate 102 may be lower than a refractive index of the polarization elements 104a, 104b etc. The refractive index of the substrate 102 may be any value between 1 and 2, and the refractive index of the polarization elements 104a, 104b etc. may be any value greater than 2.

In various embodiments, the polarization elements 104a, 104b etc. may be structures with a shape selected from a group consisting of cylinders, discs, spheres, parallelepipeds, cones, ellipsoids, and prisms. In various embodiments, the array 104 may be arranged in a Bravais lattice. In various embodiments, the array 104 may be arranged in a shape selected from a group consisting of a square, a hexagon, a honeycomb, and a triangle. In other words, the perimeter of the array 104 may form a square, a hexagon, a honeycomb, or a triangle.

The array 104 may be an ordered, periodic array. The distance or period between neighbouring polarization elements 104a, 104b etc. along a first direction may be constant. The distance or period between neighbouring polarization elements 104a, 104b etc. along a second direction perpendicular to the first direction may be constant. In various embodiments, the distance or period between neighbouring polarization elements 104a, 104b etc. along the first direction may be substantially equal to the distance or period between neighbouring polarization elements 104a, 104b etc. along the second direction.

The polarization elements 104a, 104b etc. may include a semiconductor material or a dielectric material. For instance, the polarization elements 104a, 104b etc. may include or consist of silicon or titanium dioxide.

The polarization elements 104a, 104b etc. may have subwavelength dimensions (which may be well suited to work with short pulses of electromagnetic waves as the dispersion associated is small) and may efficiently separate s polarization and p polarization using transmission and reflection, thus acting as efficient beam splitters. The physical principle generating the polarization may be based on scattering rather than absorption and, therefore, absorption and associated heating may be avoided by a suitable choice of the materials.

In various embodiments, the substrate may include or consist of a semiconductor material or a dielectric material. The substrate may, for instance, include or consist of silicon oxide ($SiO_2$), silicon nitride (SiN), aluminum oxide ($Al_2O_3$) etc. The cover layer may, for instance, include or consist of Poly(methyl methacrylate) (PMMA), polymethylsiloxane (PDMS), silicon oxide ($SiO_2$), silicon nitride (SiN), aluminum oxide ($Al_2O_3$) etc.

The first polarization may be orthogonal to the second polarization. In various embodiments, the first polarization may be s polarization, and the second polarization may be p polarization. In various other embodiments, the first polarization may be p polarization, and the second polarization may be s polarization.

In various embodiments, the anti-reflection coating 106 and/or the further anti-reflection coating 110 may include magnesium fluoride ($MgF_2$) or a suitable fluoropolymer. The anti-reflection coating 106 or the further anti-reflection coating 110 may be a single layer, or may include a plurality of sub-layers.

In various embodiments, the electromagnetic waves may be optical light. In various embodiments, the electromagnetic waves may be laser pulses. Each laser pulse may have a duration of any one value above 10 fs.

Various embodiments may also provide an arrangement including a source for emitting electromagnetic waves. The source may be referred to an electromagnetic wave source. The source may be a laser source such as a laser diode. The electromagnetic waves may be unpolarized, with electric fields and magnetic fields oscillating in all directions.

The arrangement may also include the polarization device 100 as described herein for polarizing the electromagnetic waves. The polarization device 100 may include a stacked arrangement including a medium 102 and an anti-reflection coating 106 in contact with the medium 102. The polarization device 100 may also include a periodic array 104 of polarization elements in contact with the medium 102. The polarization device 100 may be configured to, based on an electric response and a magnetic response of the periodic array 104 of the polarization elements 104a, 104b etc., transmit first polarized electromagnetic waves having the first polarization and reflect second polarized electromagnetic waves having the second polarization upon receiving the electromagnetic waves.

Figure 2:
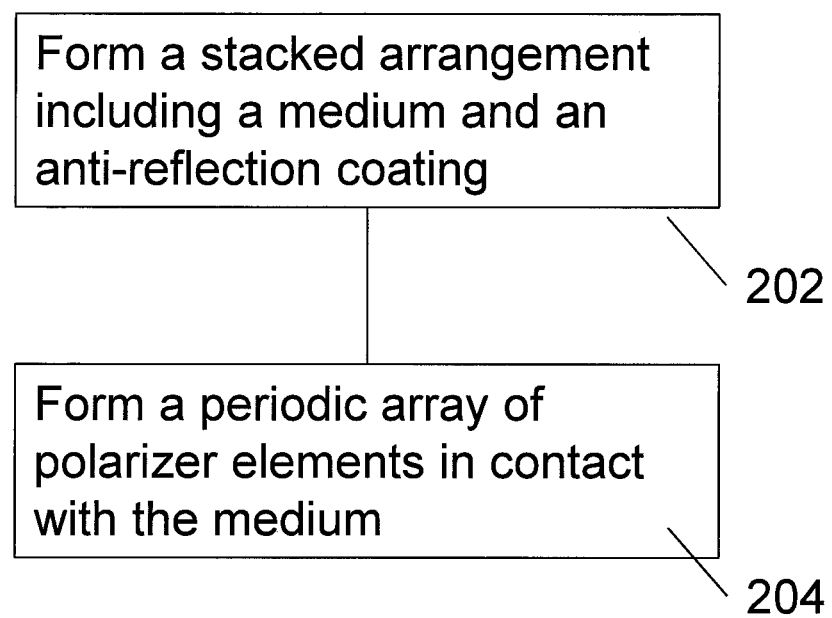
FIG. 2 is a schematic showing a method of forming device for polarizing electromagnetic waves according to various embodiments.

FIG. 2 is a schematic 200 showing a method of forming device for polarizing electromagnetic waves according to various embodiments. The method may include, in 202, forming a stacked arrangement including a medium and an anti-reflection coating in contact with the medium. The method may also include, in 204, forming a periodic array of polarization elements in contact with the medium. The polarization device may be configured to, based on an electric response and a magnetic response of the periodic array of the polarization elements, transmit first polarized electromagnetic waves having a first polarization and to reflect second polarized electromagnetic waves having a second polarization upon receiving the electromagnetic waves.

In other words, the method may include forming polarization device with an anti-reflection coating and an array of polarization elements in contact with a medium.

In various embodiments, the medium may be a substrate. In various embodiments, the medium may be a superstrate or a cover layer. In various embodiments, the polarization device may include a substrate, and a superstrate or a cover layer.

FIG. 3 is a schematic 300 showing a method of operating a polarization device for polarizing electromagnetic waves according to various embodiments. The method may include, in 302, arranging a polarization device to receive the electromagnetic waves. The polarization device may further include a stacked arrangement including a medium and an anti-reflection coating in contact with the medium. The polarization device may also include a periodic array of polarization elements in contact with the medium. The polarization device may be configured to, based on an electric response and a magnetic response of the periodic array of the polarization elements, transmit first polarized electromagnetic waves having a first polarization and to reflect second polarized electromagnetic waves having a second polarization upon receiving the electromagnetic waves.

In other words, the method may include arranging a polarization device as described herein so that it is able to receive the electromagnetic waves.

In various embodiments, the medium may be a substrate. In various embodiments, the medium may be a superstrate or a cover layer. In various embodiments, the polarization device may include a substrate, and a superstrate or a cover layer.

The electromagnetic waves may be unpolarized.

The first polarization may be p-polarization and the second polarization may be s-polarization when the electric response is greater than the magnetic response. On the other hand, the first polarization may be s-polarization and the second polarization may be p-polarization when the magnetic response is greater than the electric response.

The electromagnetic waves may be incident onto the polarization device at an angle of incidence. The angle of incidence may be the angle between a normal to a main surface of the polarization device, and the direction of propagation of the electromagnetic wave.

In various embodiments, the wavelength of the electromagnetic waves used to generate the first polarized electromagnetic waves and the second polarized electromagnetic waves may be varied by changing the angle of incidence. In other words, changing the angle of incidence may allow a different wavelength to be used while still polarizing the electromagnetic waves. The angle of incidence may be changed by rotating the polarization device.

The angle of incidence may be smaller than 45° to generate the first polarized electromagnetic waves and the second polarized electromagnetic waves, wherein electric dipole moments induced in the polarization elements oscillate in phase with the magnetic dipole moments induced in the polarization elements.

The angle of incidence may be greater than 45° to generate the first polarized electromagnetic waves and the second polarized electromagnetic waves, wherein electric dipole moments induced in the polarization elements oscillate in anti-phase with the magnetic dipole moments induced in the polarization elements.

In various embodiments, the angle of incidence and/or the wavelength of operation to generate the first polarized electromagnetic waves and the second polarized electromagnetic waves may be varied by changing the size and/or shape of the polarization elements or a geometry or shape of the array. In other words, changing the size and/or shape of the polarization elements or a geometry or shape of the array may allow a different angle of incidence and/or the wavelength of operation to be used.

The polarization device may be configured to transmit the first polarized electromagnetic waves having the first polarization and to reflect the second polarized electromagnetic waves having the second polarization, based on a group of parameters including a period of the array, a shape of the array, a material of the polarization elements, and dimensions of the polarization elements.

The polarization device may be configured not to transmit the second polarized electromagnetic waves having the second polarization, or may be configured to transmit less than 2% or less than 1% of the second polarized electromagnetic waves. The polarization device may be configured not to reflect the first polarized electromagnetic waves having the first polarization or may be configured to reflect less than 2% or less than 1% of the first polarized electromagnetic waves.

The polarization device may be configured to transmit the first polarized electromagnetic waves having the first polarization and to reflect the second polarized electromagnetic waves having the second polarization due to destructive interference caused by the electric dipole moments and the magnetic dipole moments.

In various embodiments, a method of designing or configuring the polarization device may be provided. FIG. 4 is a schematic 400 showing a method of designing or configuring the polarization device according to various embodiments. The method may include, in 402, determining polarization elements of the polarization device based on a wavelength range of interest. Determining the polarization elements may include selecting a suitable material comprised in the polarization elements based on the wavelength range of interest, and/or changing an aspect ratio of each polarization element until a predetermined overlap between the magnetic dipole resonance and the electric dipole resonance is achieved. The method may also include, in 404, determining the wavelength at which the magnetic dipole resonance occurs, and the wavelength at which the electric dipole resonance occurs which are required to polarize the electromagnetic waves. The method may further include, in 406, scaling the polarization elements proportionally until the wavelength at which the magnetic dipole resonance occurs, and the wavelength at which the electric dipole resonance occurs are within the wavelength range of interest. Scaling the polarization proportionally may include varying or changing a size of each polarization element while keeping the aspect ratio constant.

The method may start with selecting the operating wavelength of electromagnetic waves, desired transmitted polarization, and the angle of incidence. The method may also include determining an upper limit of a distance or period between neighbouring polarization elements based on the selected operating wavelength and the angle of incidence.

The method may include determining parameters of the polarization elements based on a wavelength range of interest. The method may include selecting a suitable material comprised in the polarization elements based on the wavelength range of interest. The method may also include determining a relative dimensions or aspect ratio of each polarization element based on the wavelength range of interest. The method may also include determining or identifying a magnetic dipole resonance and an electric dipole resonance based on a transmission spectrum of the polarization device and/or a reflection spectrum of the polarization device. The magnetic dipole resonance and the electric dipole resonance may be determined or identified by dips in the transmission spectrum of the polarization device, and/or peaks in the reflection spectrum of the polarization device.

The method may also include varying or reducing the distance or period between neighbouring polarization elements until the reflection spectrum of the polarization device is substantially at unity. The method may additionally include changing the relative dimensions or aspect ratio of each polarization element until a predetermined overlap between the magnetic dipole resonance and the electric dipole resonance is achieved. The method may further include changing a size of each polarization element while keeping the aspect ratio constant so that the wavelength at which the magnetic dipole resonance occurs, and the wavelength at which the electric dipole resonance occurs are within the wavelength of interest.

The method may include determining the wavelength at which the magnetic dipole resonance occurs, and the wavelength at which the electric dipole resonance occurs which are required to polarize the electromagnetic waves, i.e. generate polarized electromagnetic waves based on the electromagnetic waves. For instance, if the device is intended to transmit polarized electromagnetic waves with p-polarization, the electric dipoles induced in the polarization elements may be required to radiate predominantly over the magnetic dipoles induced. Conversely, if the device is intended to transmit polarized electromagnetic waves with s-polarization, the magnetic dipoles induced in the polarization elements may be required to radiate predominantly over the electric dipoles induced.

Currently, there may be no other technology or method that provides a systematic way of obtaining polarizers or polarizing beam-splitters for any desired transmitted polarization, operating wavelength, and angle. Various embodiments may provide a systematic way of obtaining polarizers or polarizing beam-splitters for any desired transmitted polarization, operating wavelength, and angle.

FIG. 5A is a table 500 comparing the various parameters of the polarization device according to one embodiment with conventional devices. The parameters of the conventional devices are obtained from Thorlabs Inc (http://www.thorlabs.com/), Linos Photonics Inc. (http://www.qioptiq-shop.com/) and Codixx AG (https://www.codixx.de/).

FIG. 5B shows the conventional devices illustrating in table 500a. The conventional devices include birefringent prisms (calcite) 502, non-birefringent prisms ($SF_2$ glass) 504, thin films (BK7 glass) 506, isolated particle based prisms (spheroidal silver particles) 508, and wire grid based prisms (metallic wires) 510.

Figure 5C:
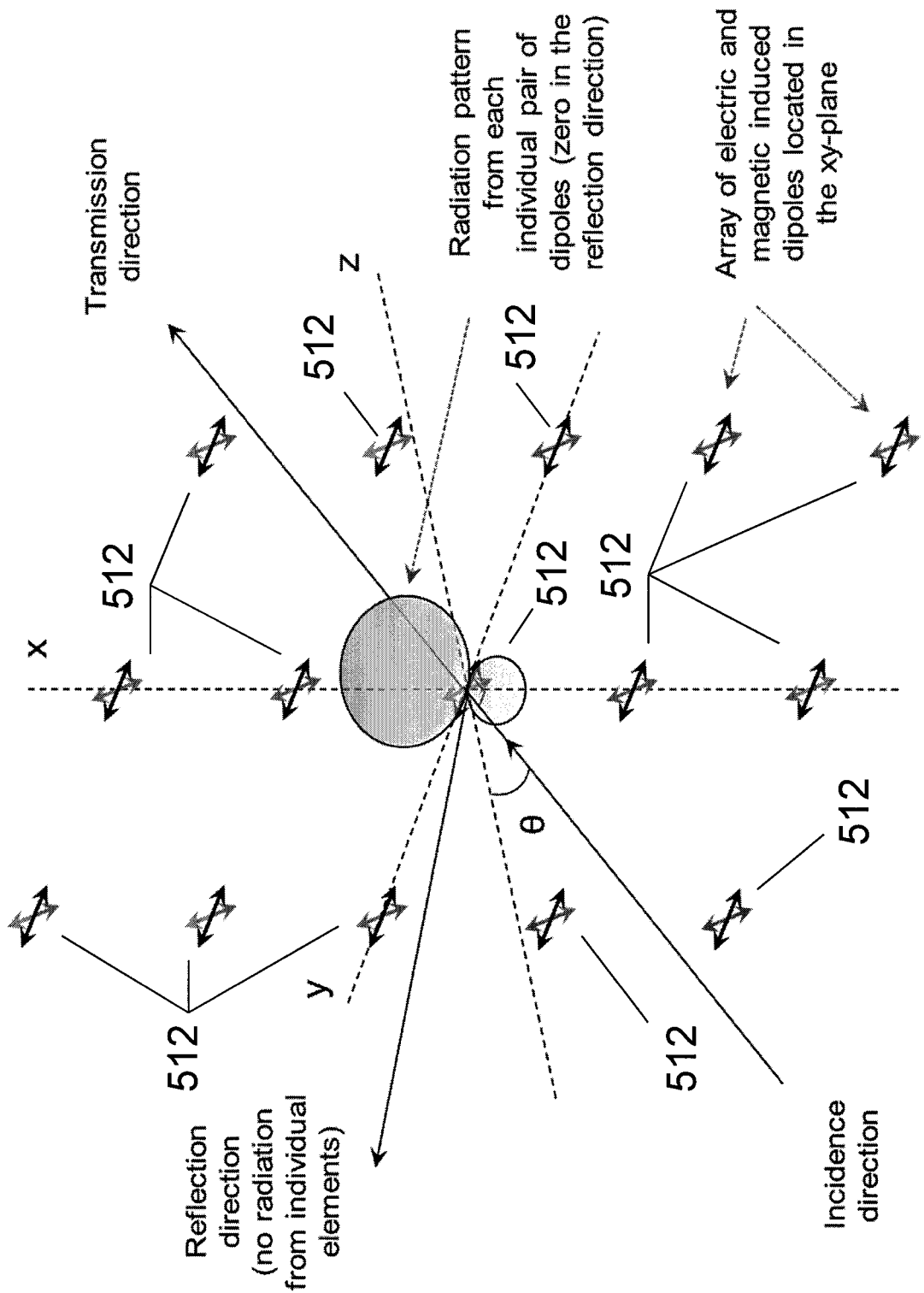
FIG. 5C shows a plurality of polarizing elements according to various embodiments.

FIG. 5C shows a plurality of polarizing elements 512 according to various embodiments. The polarizing elements 512 may exhibit both electric response and magnetic response.

As shown in FIG. 5C, the plurality of polarizing elements 512 may each have a pair of electric dipoles and magnetic dipoles induced in the xy-plane by obliquely incident electromagnetic waves. The dipoles may be located in arrays in such a way that no diffraction happens. In the general situation, each pair of dipoles may re-radiate (scatter) some of the energy in the directions of reflection and transmission, leading to the overall reflection and transmission of the system, and may also absorb some of the energy as well. Radiation in any other direction may be compensated by the rest of the dipoles in the array. However, there may be particular relative orientations, amplitudes and phases of the electric dipoles and magnetic dipoles for which the radiation from each pair is suppressed in the direction of reflection and, thus, the total reflection from the system is zero. For each angle and polarization of incidence (which determines the orientation of the dipoles in the array), there may be only one particular ratio of amplitudes and phases that produces zero reflection. Different incidence conditions (angle and polarization) may lead to different amplitudes and phase ratios between the pair of dipoles.

Figure 6A:
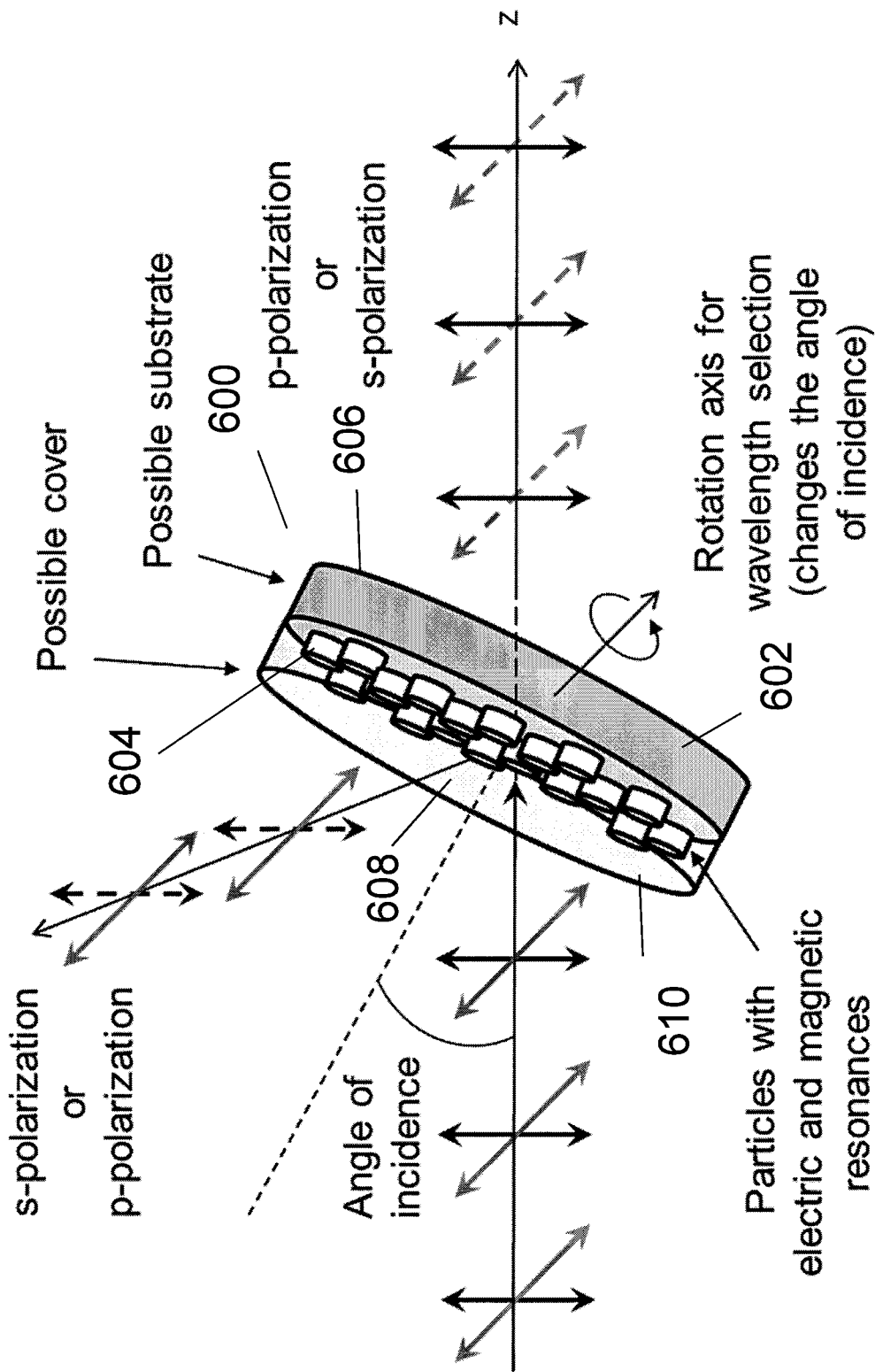
FIG. 6A shows a polarization device according to various embodiments.

FIG. 6A shows a polarization device 600 according to various embodiments. The polarization device 600 may include a substrate 602. The polarization device 100 may also include a periodic array 604 of polarization elements on a first surface of the substrate 602. The polarization device 600 may further include a cover layer 608 covering the periodic array 604 of polarization elements. The cover layer 608 may be on the first surface of the substrate 602.

The periodic array 604 of polarization elements may be a sub-diffractive periodic array. The polarization elements may have a high refractive index, n, of more than 2 (n>2), while the substrate 602 may be a low index substrate with a refractive index of between 1 and 2 (1<n<2). The periodic array 604 of polarization elements may be covered by the cover layer 608. The cover layer 608 may also be referred to as a superstate, and may be index matched to the substrate 602. In other words, the refractive index of the cover layer 608 may be substantially equal to the refractive index of the substrate 602.

The polarization device 600 may further include an anti-reflection coating 606 on a second surface of the substrate 602 opposite the first surface. The anti-reflection coating 606 and the cover layer or superstrate 608 may be on opposing surfaces of the substrate 602. The polarization device 600 may also include a further anti-reflection coating 610 on the cover layer or superstrate 608. The further anti-reflection coating 610 and the substrate 602 may be on opposing surfaces of the cover layer or superstrate 608. The anti-reflection coating 606 and/or the further anti-reflection coating 610 may reduce or avoid reflection induced by the substrate 602 and/or the superstrate 608.

The polarization elements may be referred to as particles. Particles used in the current context may refer to structures having any suitable shape. Particles may be spheres, cylinders, discs, spheres, parallelepipeds, ellipsoids, cones, or prisms. High index particles may exhibit strong electric and magnetic responses that can interfere suppressing scattered radiation by each particle in the direction of reflection under either p-polarization or s-polarization oblique incidence depending on the particular wavelength. This may imply zero reflection and, in the absence of absorption, leads to perfect transmission. The effect cannot happen for both polarizations simultaneously. Therefore, for an unpolarized incident wave the reflected portion may be purely polarized with polarization orthogonal to that perfectly transmitted. Moreover, except at angles at which scattering is suppressed, the high index particles may strongly scatter light leading to quasi-perfect reflection. Thus, one polarization can be perfectly transmitted and the orthogonal polarization may be entirely reflected.

In other words, the polarization device 600 may be configured to, based on an electric response and a magnetic response of the periodic array 604 of the polarization elements, transmit first polarized electromagnetic waves having a first polarization and reflect second polarized electromagnetic waves having a second polarization orthogonal to the first polarization upon receiving the electromagnetic waves. The first polarized electromagnetic waves may not have the second polarization, and the second polarized electromagnetic waves may not have the first polarization. The particles may be nanoparticles.

Therefore, various embodiments may be used to make efficient polarizing beam splitters. The wavelength range of operation of the device 600 may correspond to the spectral position of the electric and magnetic resonance of the particles. The positions of the electric resonance and the magnetic resonance may be defined by the size of the particles and refractive index of the particle material. Thus, the wavelength at which the electric dipole resonance occurs and the wavelength at which the magnetic dipole resonance occurs may be adjusted for a desired wavelength range and shifted from visible to infra-red and microwave spectrum. The material of the particles may have high refractive index (>2), and low absorption at the wavelength of operation of the device 600.

Figure 6B:
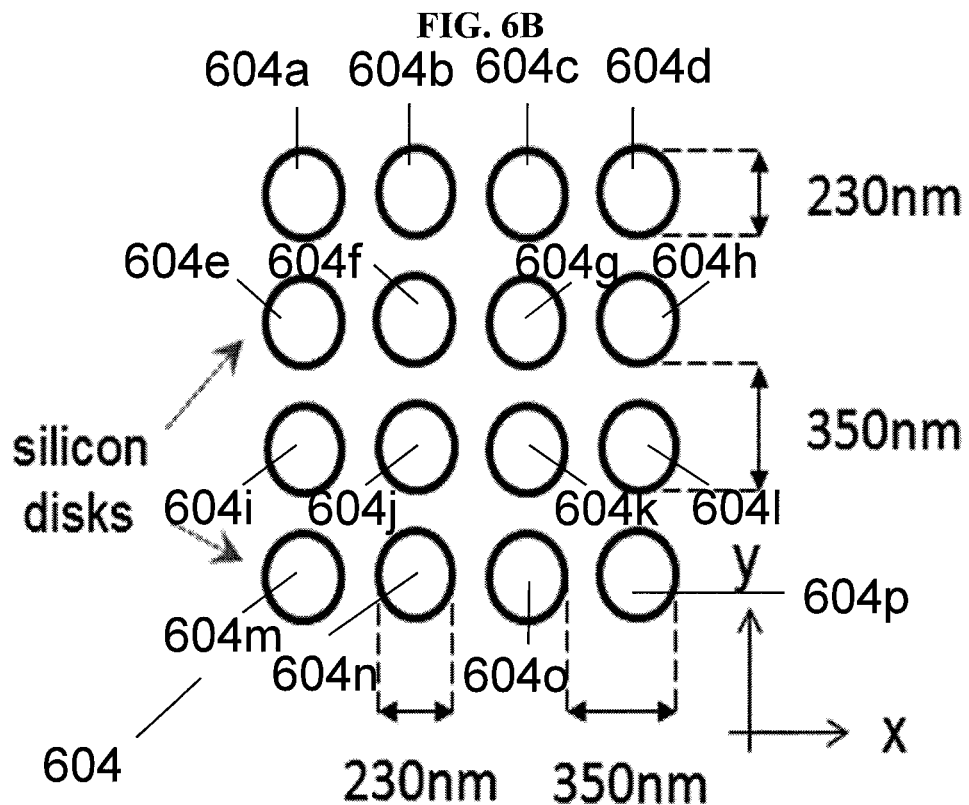
FIG. 6B shows a top planar view of the periodic array comprised in the device shown in FIG. 6A according to various embodiments.
Figure 6C:
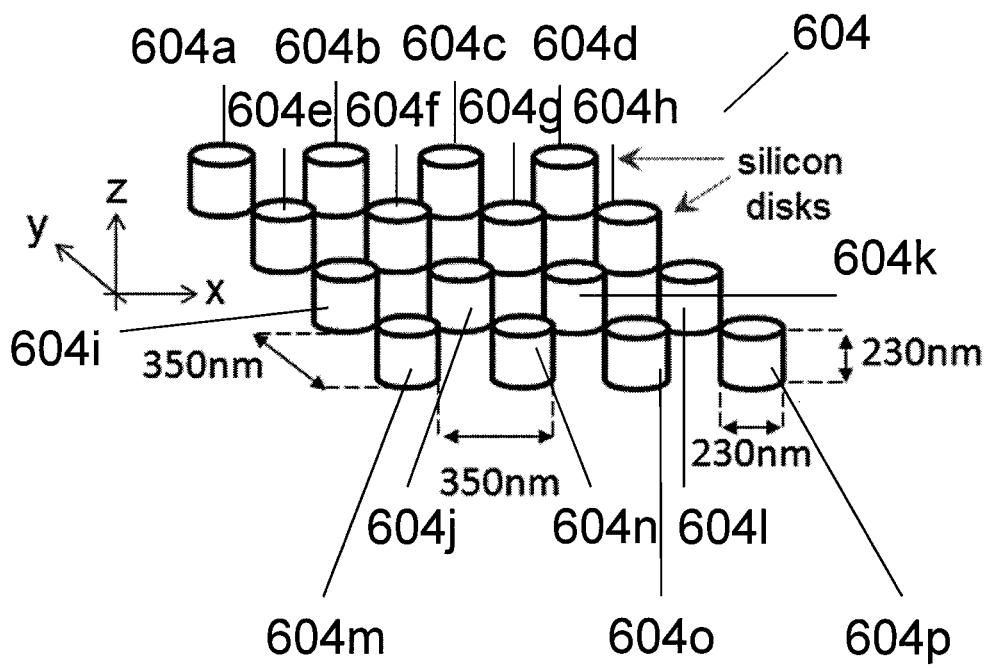
FIG. 6C shows a perspective view of the periodic array comprised in the device shown in FIG. 6A according to various embodiments.

The array 604 of the polarization device 600 shown in FIG. 6A may include silicon nanodisks. The polarization device 600 may be used as a very efficient polarizing beam splitter at the red part of visible spectrum. FIG. 6B shows a top planar view of the periodic array 604 comprised in the device 600 shown in FIG. 6A according to various embodiments. FIG. 6C shows a perspective view of the periodic array 604 comprised in the device 600 shown in FIG. 6A according to various embodiments. As shown in FIGS. 6B and 6C, the nanodisks 604a-p may form a simple regular lattice arrangement. The array 604 may be arranged in a shape of a square, and each nanodisk may be a cylinder with a diameter of about 230 nm and a height of about 230 nm. The period between the nanodisks along each row may be substantially equal, and the period between the nanodisks along each column may also be substantially equal. The period between the nanodisks along each row may be substantially equal to the period between the nanodisks along each column, and may be about 350 nm as shown in FIGS. 6B and 6C. The rows may be arranged orthogonally to the columns. In other words, a row may run substantially perpendicular to a column. The particular dimensions may be determined in such a way that the device 600 exhibits good figures-of-merit when working at wavelengths of around 800 nm. The device 600 may work by efficiently transmitting p-polarized waves and efficiently reflecting s-polarized ones under oblique incidence angles of around 60 degrees to the surface normal. Scaling the different sizes involved (height, radii and lattice period) may change the device characteristics regarding working wavelength, angle of incidence, and/or polarization.

It may be envisioned that the array may instead be arranged in other shapes such as hexagonal, honeycomb, triangular etc. Further, it may also be envisioned that each polarization elements 604a-p may be of other shapes such as spheres, parallelepipeds, prisms etc. There may be a different number of polarization elements 604a-p from that depicted in FIGS. 6B and 6C, and the dimensions of each polarization element (e.g. diameter, height etc.) as well as the period between neighbouring elements may also differ from that depicted in FIGS. 6B and 6C. In various embodiments, the period between the polarization elements along each row may substantially different to the period between the polarization elements along each column.

The performance of the polarizing beam splitter 600 based on the silicon nanodisks 604a-p are demonstrated by using Finite Element Method (FEM) based full numerical simulations (COMSOL Multiphysics). Silicon (Si) may be chosen to design the device 600 operating in the red part of the visible spectrum and the near-IR spectral range due to its high refractive index (>3.5) and very low dissipation (at wavelengths above 700 nm). Electric and magnetic resonances in silicon particles have been widely studied and their properties are relatively well known.

Figure 6D:
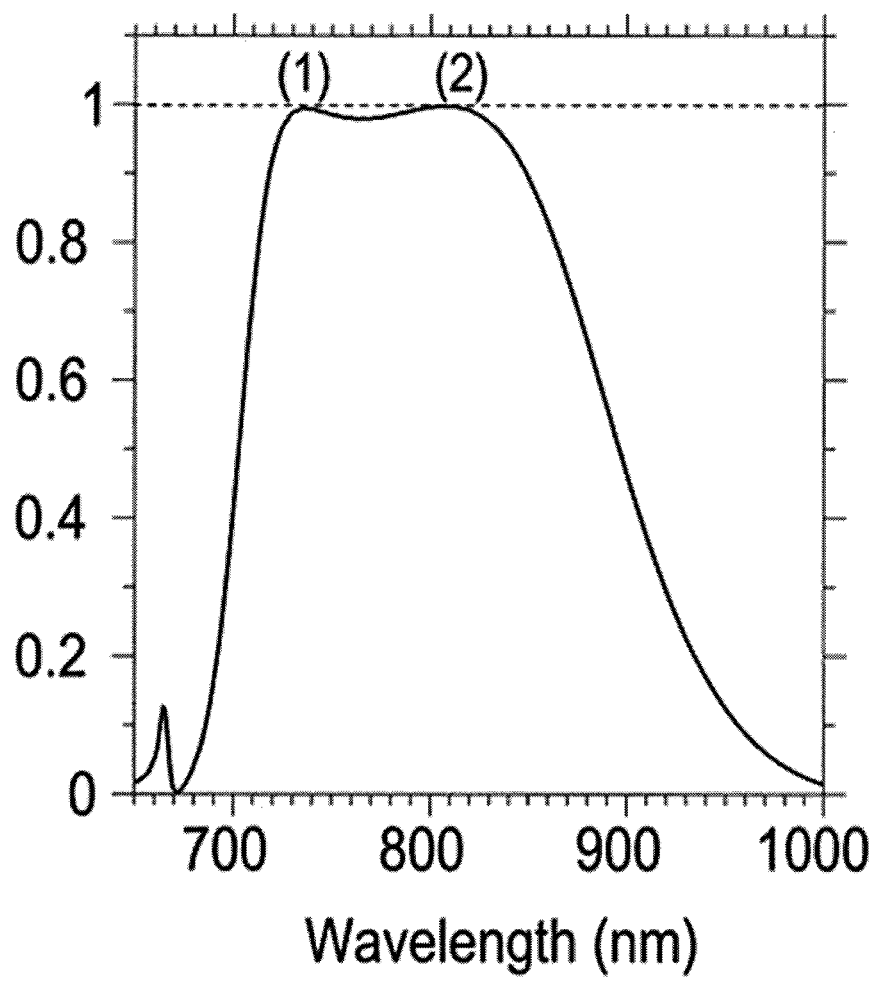
FIG. 6D is a plot of reflection as a function of wavelength (nanometers or nm) showing the simulated reflection spectrum of the array of nanodisks according to various embodiments under normal incidence illumination.

FIG. 6D is a plot 612 of reflection as a function of wavelength (nanometers or nm) showing the reflection spectrum of the array 604 of nanodisks 604a-p according to various embodiments under normal incidence illumination. The plane electromagnetic wave may propagate in the positive z-direction with the electric field directed along the x-axis (shown in FIG. 6C). The positions of the electric dipole resonance and the magnetic dipole resonance are indicated by (1) and (2) respectively.

A broad region of high reflectivity is seen with two close maxima at around 730 nm (marked as (1)) and around 820 nm (marked as (2)). These two maxima correspond to the excitation of electric dipole resonant mode and magnetic dipole resonant mode in the silicon cylinders, respectively. The simultaneous excitation of electric dipoles and magnetic dipoles may lead to suppression of scattering at certain angles depending on their relative amplitudes and phases.

When the scattering suppressed angle coincides with the angle of reflection, the device 600 may show no reflection.

In various embodiments, the particular geometry and dimensions of the nanodisks arrangement 604 may be designed to make the device 600 show zero reflection under p-polarized (p-pol.) incident light at around 60 degrees to the surface normal for wavelengths around 800 nm. The opposite polarized s-polarized light, on the contrary, may have close-to-unity reflection by the device 600 due to the fact that the nanodisks are resonant and strongly scatter light.

Figure 7A:
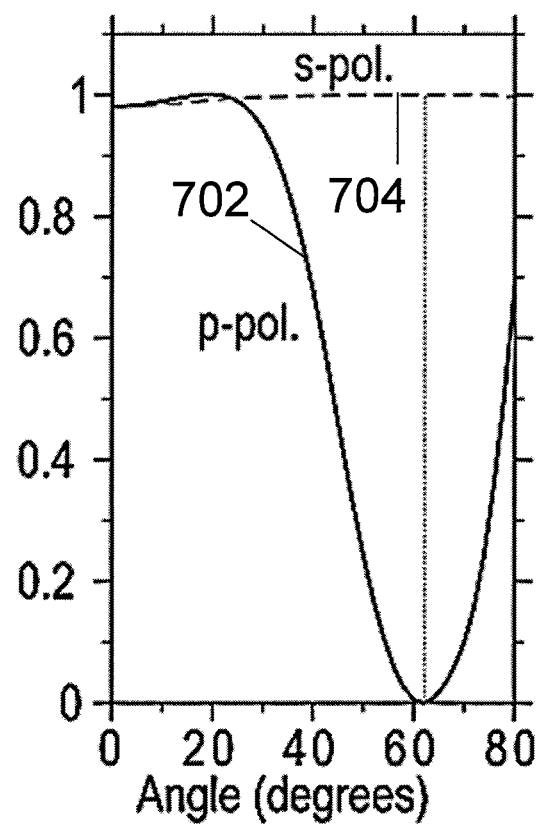
FIG. 7A is a plot of reflection as a function of angle of incidence (degrees) showing simulated reflection of p- and s-polarized plane electromagnetic waves at 833 nm wavelength by the device according to various embodiments as a function of the angle of incidence.

FIG. 7A is a plot 700a of reflection as a function of angle of incidence (degrees) showing simulated reflection of p- and s-polarized plane electromagnetic waves at 833 nm wavelength by the device according to various embodiments as a function of the angle of incidence. The value of reflection varies from 0 to 1, with 0 representing no reflection and 1 representing perfect reflection.

The solid line 702 represents the simulated reflectivity of the system under p-polarized light incidence with a wavelength of 833 nm as a function of the angle of incidence. It shows a clear minimum at about 62 degrees of incidence. The corresponding simulated reflectivity under s-polarized light incidence in the same conditions is shown as a dashed, line 704. For s-polarization, the reflectivity from the array of disks is close to unity.

Figure 7B:
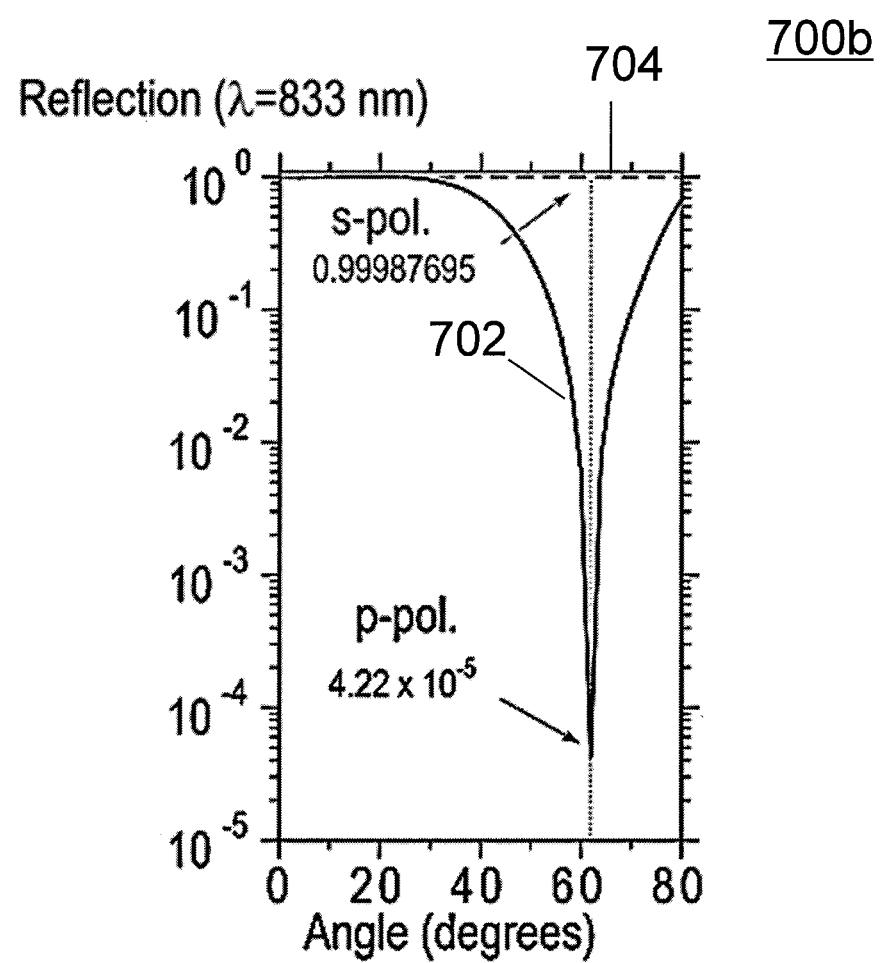
FIG. 7B is a plot of reflection (logarithmic scale) as a function of angle of incidence (degrees) showing simulated reflection of p- and s-polarized plane electromagnetic waves at 833 nm wavelength by the device according to various embodiments as a function of the angle of incidence.

FIG. 7B is a plot 700b of reflection (logarithmic scale) as a function of angle of incidence (degrees) showing simulated reflection of p- and s-polarized plane electromagnetic waves at 833 nm wavelength by the device according to various embodiments as a function of the angle of incidence. Plot 700b corresponds to plot 700a but is in logarithmic scale along the y axis for a better visualization of the values reached in the vanishing reflection condition in p-polarization. While the reflection under p-polarization at about 62 degrees may be as low as $4.22 \times 10^{-5}$, the reflection under s-polarization may be as high as 0.99987695.

Figure 7C:
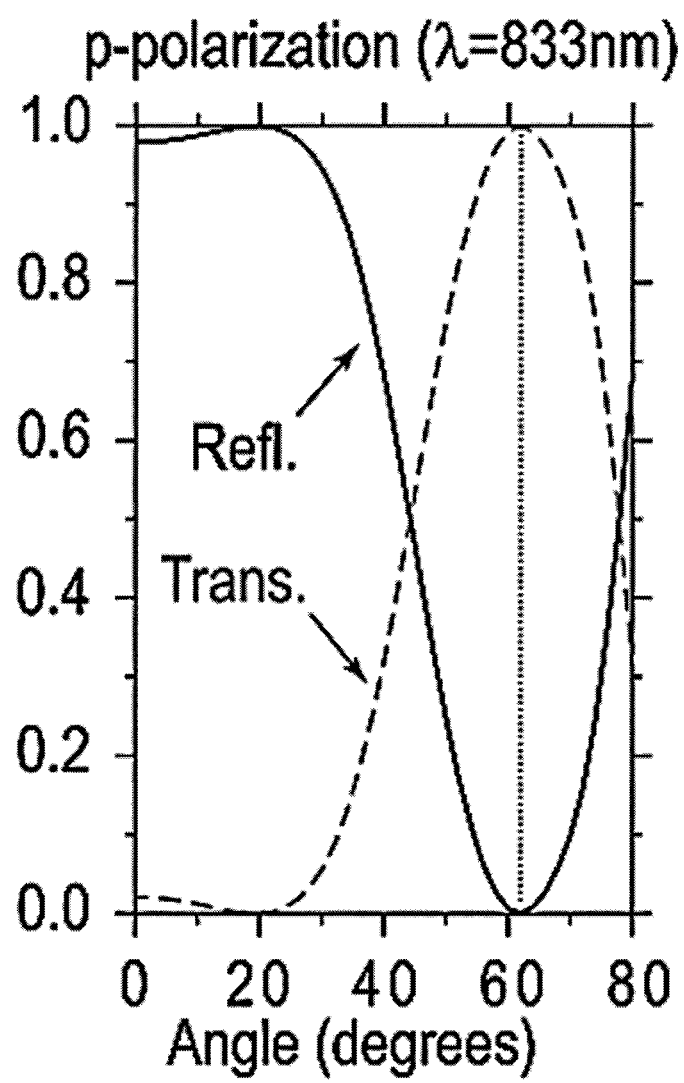
FIG. 7C is a plot of reflection/transmission as a function of angle of incidence (degrees) showing simulated reflection and transmission of p-polarized plane electromagnetic waves at 833 nm wavelength by the device according to various embodiments as a function of incidence.
Figure 7D:
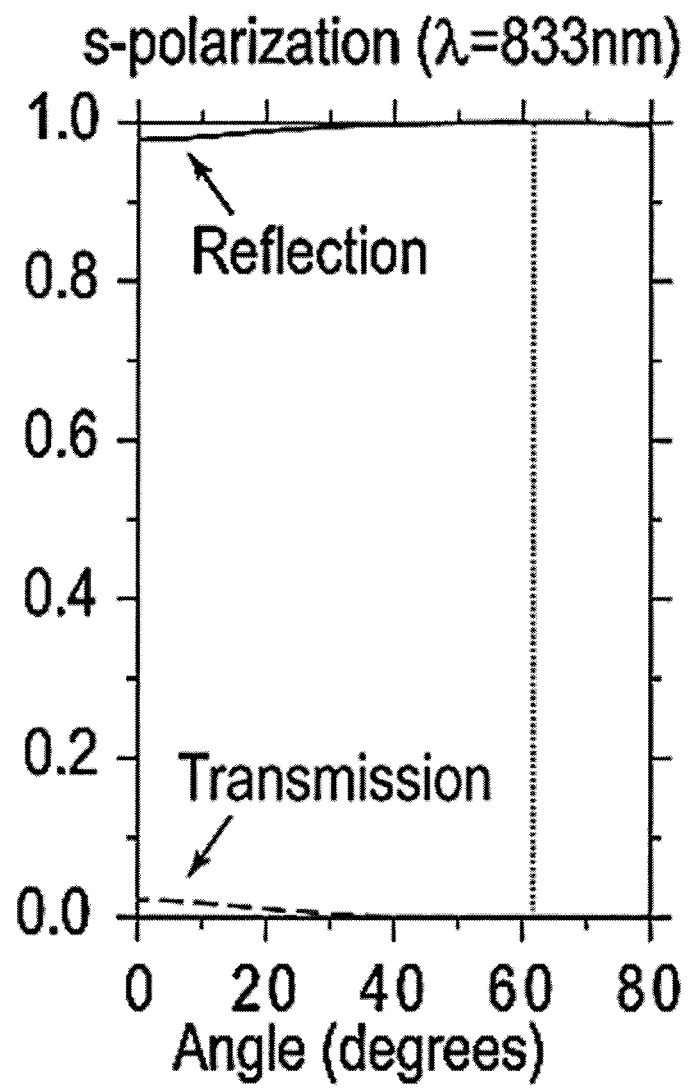
FIG. 7D is a plot of reflection/transmission as a function of angle of incidence (degrees) showing simulated reflection and transmission of s-polarized plane electromagnetic waves at 833 nm wavelength by the device according to various embodiments as a function of incidence.

FIG. 7C is a plot 700c of reflection/transmission as a function of angle of incidence (degrees) showing simulated reflection and transmission of p-polarized plane electromagnetic waves at 833 nm wavelength by the device according to various embodiments as a function of the angle of incidence. FIG. 7D is a plot 700d of reflection/transmission as a function of angle of incidence (degrees) showing simulated reflection and transmission of s-polarized plane electromagnetic waves at 833 nm wavelength by the device according to various embodiments as a function of the angle of incidence. The value of transmission varies from 0 to 1, with 0 representing no transmission and 1 representing perfect transmission. Assuming no absorption by the polarization device, the value of reflection (R) and the value of transmission (T) of an electromagnetic wave may be complementary to each other, i.e. R+T=1.

The complete set of transmission and reflection curves as a function of the angle of incidence for p-polarization and s-polarization in FIGS. 7C and 7D demonstrate negligible absorption. Due to the low absorption, a high damage threshold may be achievable for devices according to various embodiments, as opposed to most particle-based polarizers which are based on absorption.

Figure 8:
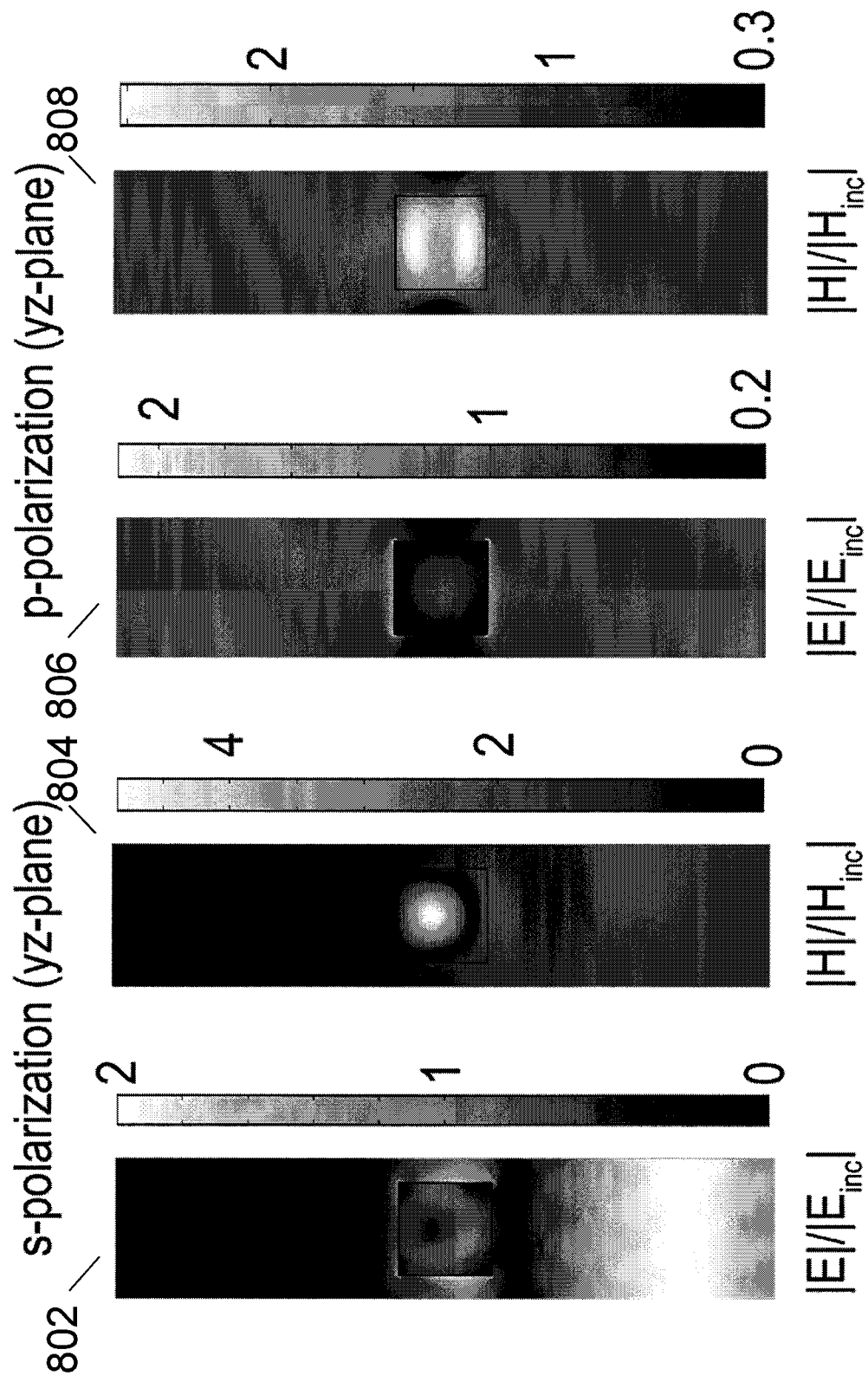
FIG. 8 shows simulated electric and magnetic near fields normalized to the incident ones for a unit cell of the array according to various embodiments described in FIGS. 7A-D.

FIG. 8 shows simulated electric and magnetic near fields normalized to the incident ones for an unit cell of the array according to various embodiments described in FIGS. 7A-D. The wavelength is 833 nm and the angle of incidence is 62 degrees. 802 indicates the simulated electric fields for waves having s-polarization, and 804 indicates the simulated magnetic fields for waves having s-polarization. 806 indicates the simulated electric fields for waves having p-polarization, and 808 indicates the simulated magnetic fields for waves having p-polarization.

The high concentration of electromagnetic fields inside and around the particles provides clear evidence of resonances being excited in the particles. The excitation of these resonant electric and magnetic dipole modes, and the possibility of directional interference of radiation generate the observed effect. Thus, the device according to various embodiments may be used under the described conditions as a polarizing beam splitter operating at 833 nm with transmission values >99.99% for p-polarization (reflection <0.005%), reflection values >99.98% (transmission <0.01%) for s-polarization and extinction ratios on the order of about $10^5:1$ for the reflected beam, and about $10^4:1$ for the transmitted one, for a polarizing layer of about 230 nm thickness. This example shows that a specific design based on arrangements of silicon nanoparticles with electric and magnetic resonances may be used as an efficient, ultra-thin polarizer or polarizing beam-splitter.

A different operating wavelength may be selected by changing the angle of incidence of the beam with respect to the polarization device. Each angle of incidence may require different relative amplitudes and phases of the electric dipoles and/or the magnetic dipoles to cancel scattering in the reflection direction, which may occur at different wavelengths.

Figure 9A:
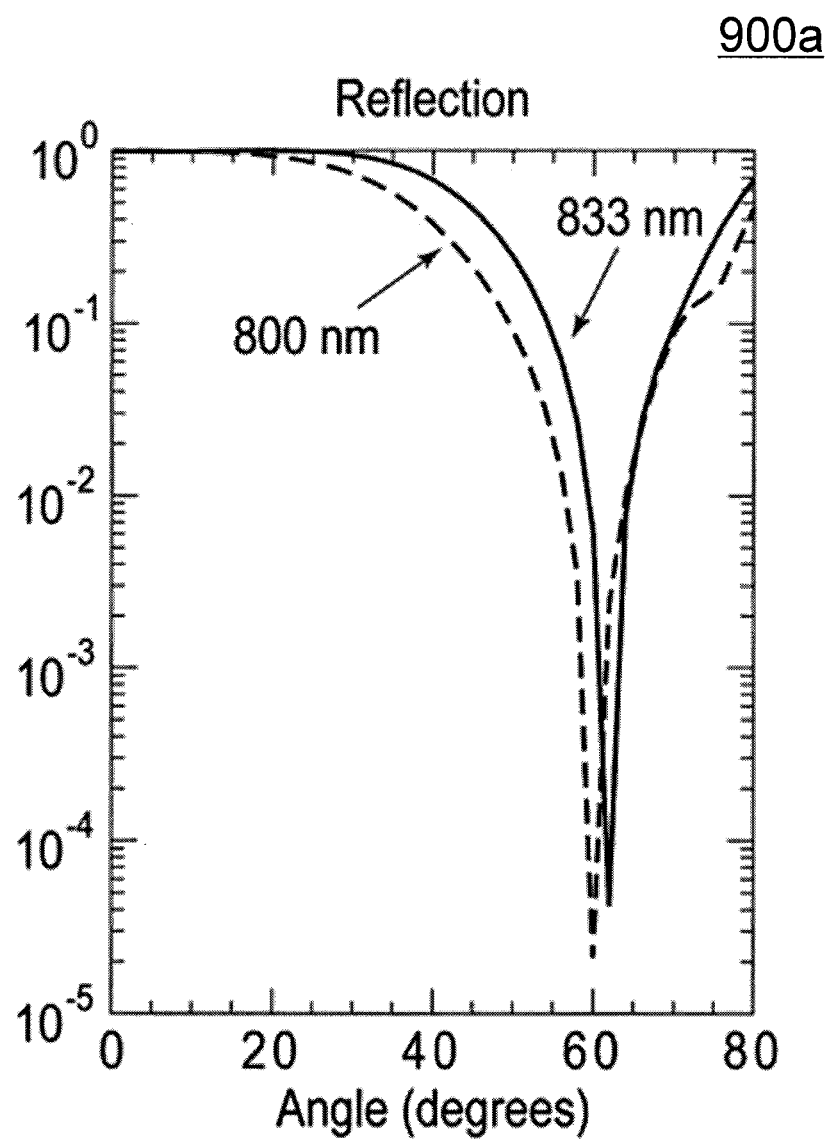
FIG. 9A is a plot of reflection in logarithmic scale as a function of angle (degrees) showing the reflection curves at different angles of incidence with respect to the polarization device according to various embodiments at about 800 nm wavelength and at about 833 nm wavelength.

FIG. 9A is a plot 900a of reflection in logarithmic scale as a function of angle (degrees) showing the reflection curves at different angles of incidence with respect to the polarization device according to various embodiments at about 800 nm wavelength and at about 833 nm wavelength. The minimum in reflection of p-polarization may occur at about 60 degrees at about 800 nm, compared to about 62 degrees at about 833 nm. Thus, by rotating the device to vary the angle of incidence, it may be possible to select different operating wavelengths in which the highest performance is obtained. For a single fixed angle of incidence, the operation band of the device may extend to hundreds of nanometers with relatively high performance characteristics.

Figure 9B:
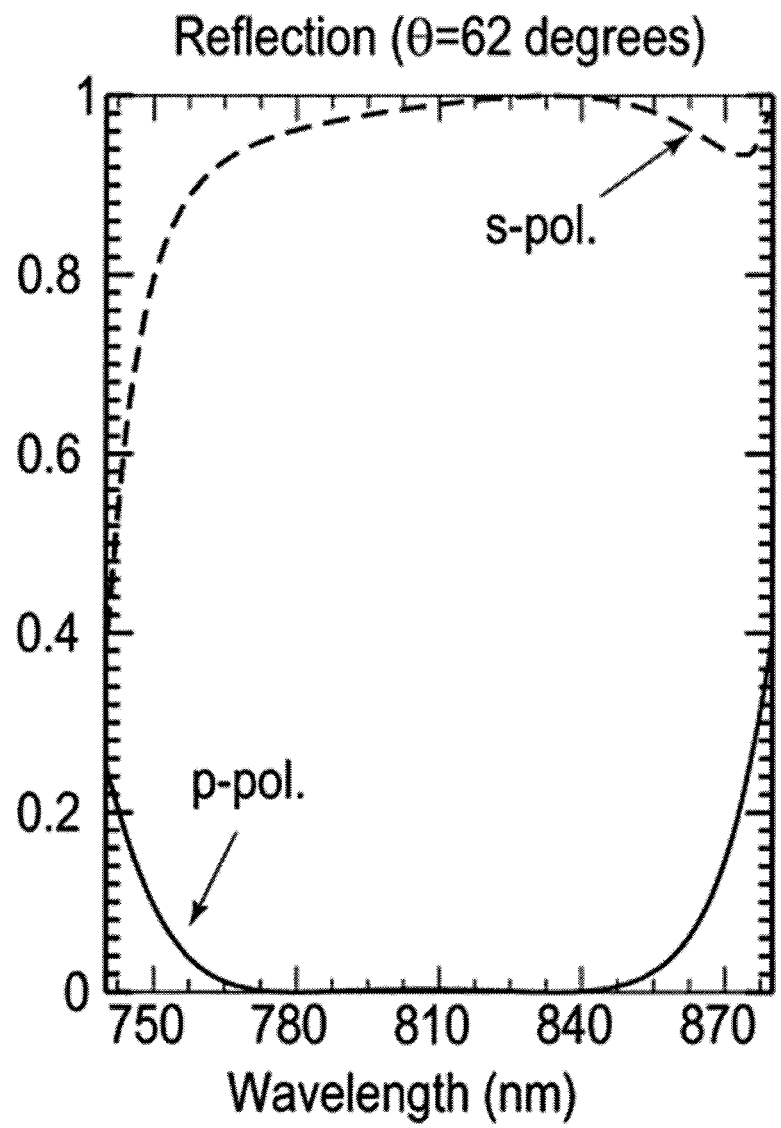
FIG. 9B is a plot of reflection as a function of wavelength (nanometers or nm) showing the simulated reflection spectra for p- and s-polarized light at a fixed 62 degree angle of incidence with respect to the polarization device according to various embodiments.

FIG. 9B is a plot 900b of reflection as a function of wavelength (nanometers or nm) showing the simulated reflection spectra for p- and s-polarized light at a fixed 62 degree angle of incidence with respect to the polarization device according to various embodiments. The device shows a bandwidth >70 nm in which low reflection (0.001-1%) is found for p-polarization together with high reflection for s-polarization (>95%), giving an extinction ratio >300:1 in the whole range. This demonstrates that it may be possible to select the operating wavelength for high performance (within a given range determined by the specific design) by changing the angle of incidence of the beam onto the device. The device may also show a broad operating bandwidth with relatively high performance characteristics.

As the thickness of the polarizer may be less than half of the wavelength, even though the polarizing effect may be large due to the resonances excited in the particles, the overall phase dispersion induced may be small. Various embodiments may be well suited to work with short pulses. For a Gaussian pulse centered at about 810 nm with a full width at half-maximum (FWHM) of about 50 nm with a minimum pulse duration of 20 femtoseconds (fs), the pulse duration after being transmitted through the device may be estimated from the phase delay induced by the device on the extremal wavelengths of the pulse. The phase delay for the range of wavelengths considered in FIG. 9B may be represented in FIG. 9C.

Figure 9C:
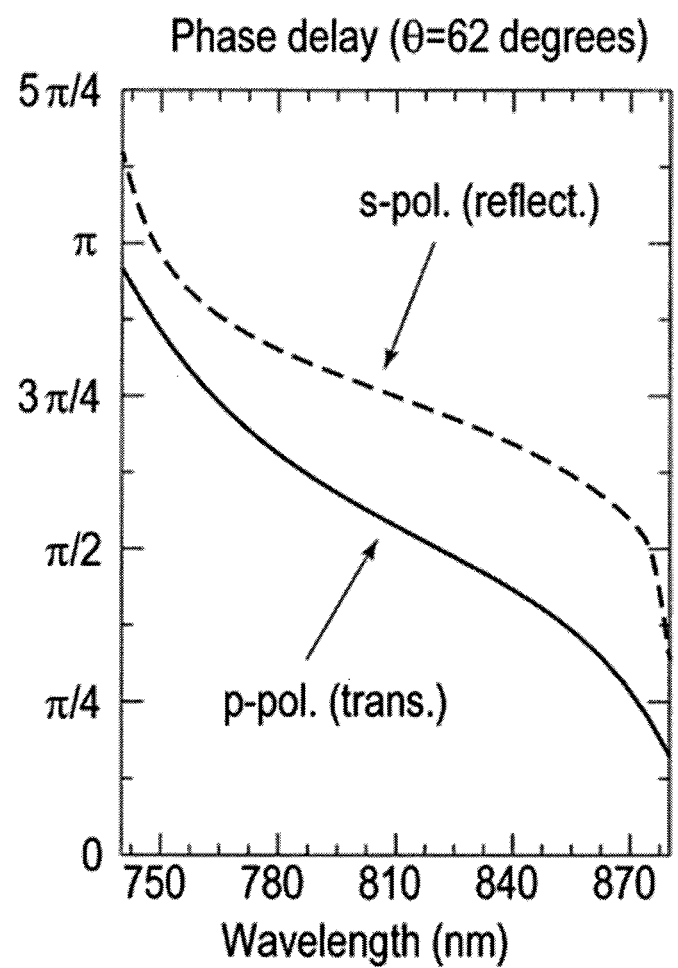
FIG. 9C is a plot of phase delay (radians) as a function of wavelength (nanometers or nm) showing the phase delay experienced by p-polarized waves and s-polarized waves incident at about 62 degrees onto the polarization device according to various embodiments as they are respectively transmitted through or reflected from the polarization device.

FIG. 9C is a plot 900c of phase delay (radians) as a function of wavelength (nanometers or nm) showing the phase delay experienced by p-polarized waves and s-polarized waves incident at about 62 degrees onto the polarization device according to various embodiments as they are respectively transmitted through or reflected from the polarization device. For an initial pulse duration of about 20 fs, the chirped pulse duration about is 20.5 fs. As a comparison, in a commercial fused silica based polarizing beam splitter cube (http://www.thorlabs.com/) of ½" (12.7 mm), the same pulse may have a final duration around 65 fs. FIG. 9D is a table 900d comparing the transmitted pulse durations of a polarization device according to various embodiments and the commercial fused silica based polarizing beam splitter cube. For a reflected s-polarized pulse, the phase delay between the pulse extremal wavelengths may be very close to that of transmission, leading to similar values of the pulse duration after reflection. Various embodiments may be suitable to be used as a polarizer or polarizing beam-splitter for short (10 s fs to 100 s fs) laser pulses.

By changing the size or shape of the particles or modifying the geometry of the array, it may be possible to change the spectral position of the dipolar resonances, and ultimately the conditions (wavelength of operation, angle of incidence and/or polarization) under which the polarization device works.

Figure 9E:
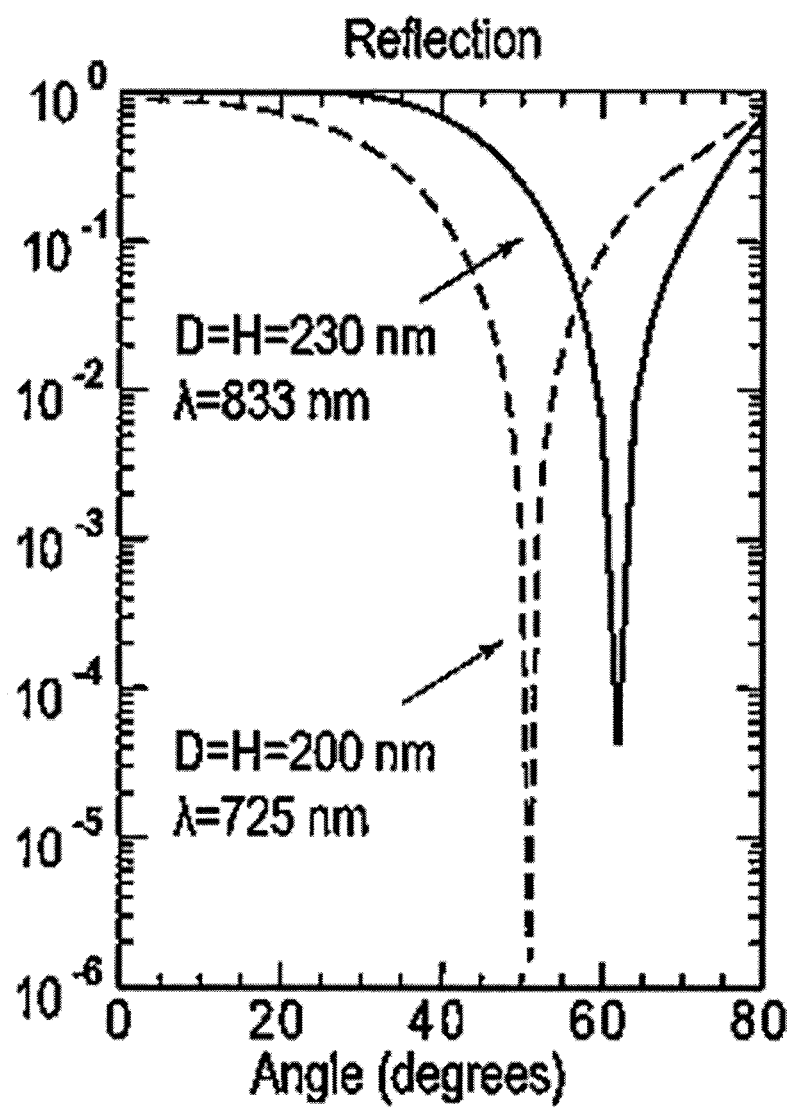
FIG. 9E is a plot of reflection in logarithmic scale as a function of angle of incidence (degrees) comparing the reflection curves for p-polarized illumination by the polarization device with an array shown in FIGS. 6B-C according to various embodiments, and a polarization device with an array arranged in a similar manner, but with a diameter of about 200 nm and a height of about 200 nm according to various embodiments.

By modifying the size of the particles in the polarization device, it may be possible to operate at a different wavelength and/or angle of incidence. FIG. 9E is a plot 900e of reflection in logarithmic scale as a function of angle of incidence (degrees) comparing the reflection curves for p-polarized illumination by the polarization device with an array shown in FIGS. 6B-C according to various embodiments, and a polarization device with an array arranged in a similar manner, but with a diameter of about 200 nm and a height of about 200 nm according to various embodiments. The wavelengths are those for which the best transmission is found. The polarization device with a diameter of about 200 nm and a height of about 200 nm may have an operating wavelength of about 725 nm, and an angle of incidence of about 51 degrees. The polarization device with a diameter of about 230 nm and a height of about 230 nm may have an operating wavelength of about 833 nm, and an angle of incidence of about 62 degrees.

The results in FIGS. 7A-D and FIGS. 8A-E are obtained assuming the polarizing elements are in air, but the same design may be used with polarizing elements over a substrate, which may have a refractive index is <2 (e.g. $SiO_2$, SiN, $Al_2O_3$, etc.). Further, should the polarizing elements be formed on a substrate, the device may also include a cover with a refractive index as close as possible or substantially equal to that of the substrate to keep the same performance benchmark. A cover may additionally provide protection against degradation due to oxidation. In order to avoid unwanted reflection from the front and back ends of the polarizing device due to the presence of the substrate and cover, usual anti-reflection (AR) coatings may be used.

Figure 10:
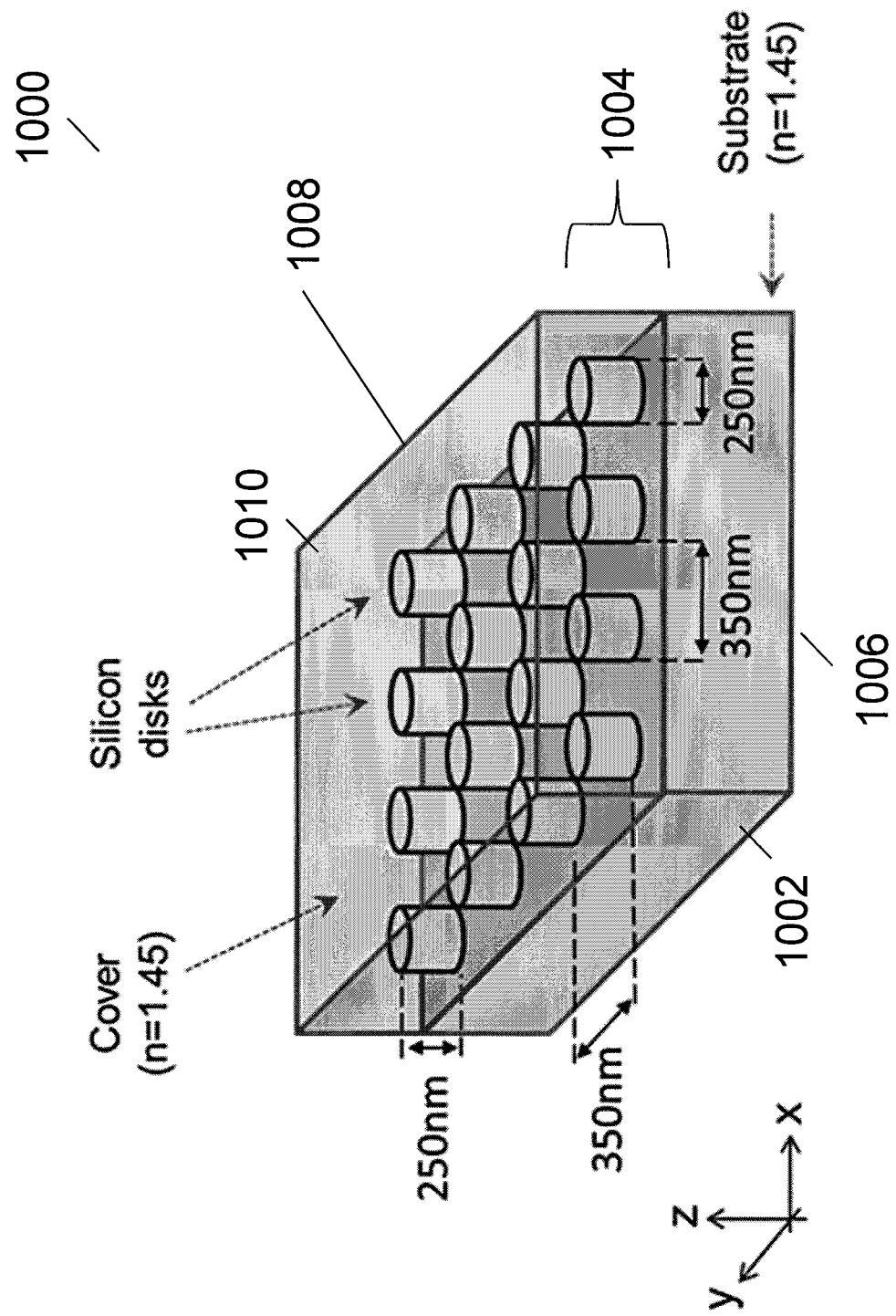
FIG. 10 is a schematic of a polarization device according to various embodiments.

FIG. 10 is a schematic of a polarization device 1000 according to various embodiments. The polarization device 1000 may include a substrate 1002. The polarization device 1000 may also include the periodic array 1004 of polarization elements, e.g. silicon nanodisks, on a first surface of the substrate 1002. The polarization device 1000 may further include the anti-reflection coating 1006 on a second surface of the substrate 1002 opposite the first surface. The polarization device 1000 may also include a cover layer 1008 covering the periodic array 1004 of polarization elements.

The substrate 1002 may be a $SiO_2$ substrate, and cover layer 1008 may include a material with the same refractive index as $SiO_2$. The polarization device 1000 may also include an anti-reflection coating 1006 on the substrate 1002, and a further anti-reflection coating 1010 on the cover layer 1008.

The dimensions of the disks in array 1004 may be chosen in such a way that the operating wavelength is the same (833 nm) but the polarization device 1000 may work at a different angle of incidence of about 20 degrees. Each disk may have a height of about 250 nm and a diameter of about 250 nm. The disks may be arranged in a simple square lattice with a period of about 350 nm.

Figure 11A:
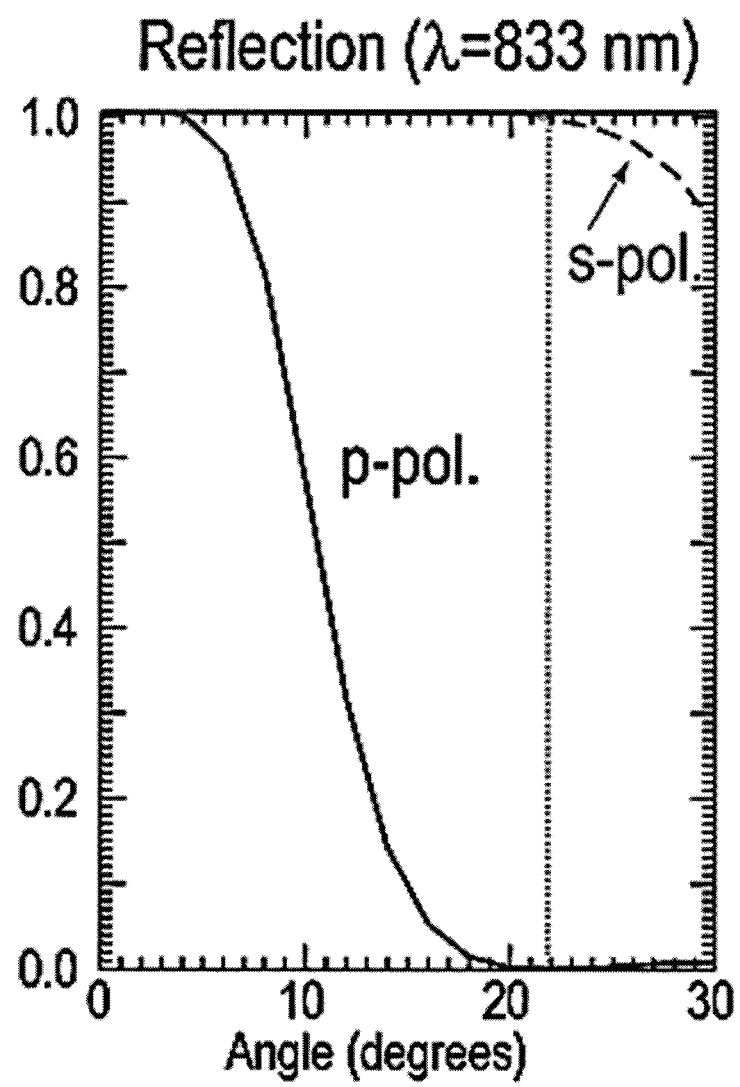
FIG. 11A is a plot of reflection as a function of angle (degrees) showing the simulated reflection by the polarization device according to various embodiments for both polarizations at about 833 nm wavelength.
Figure 11B:
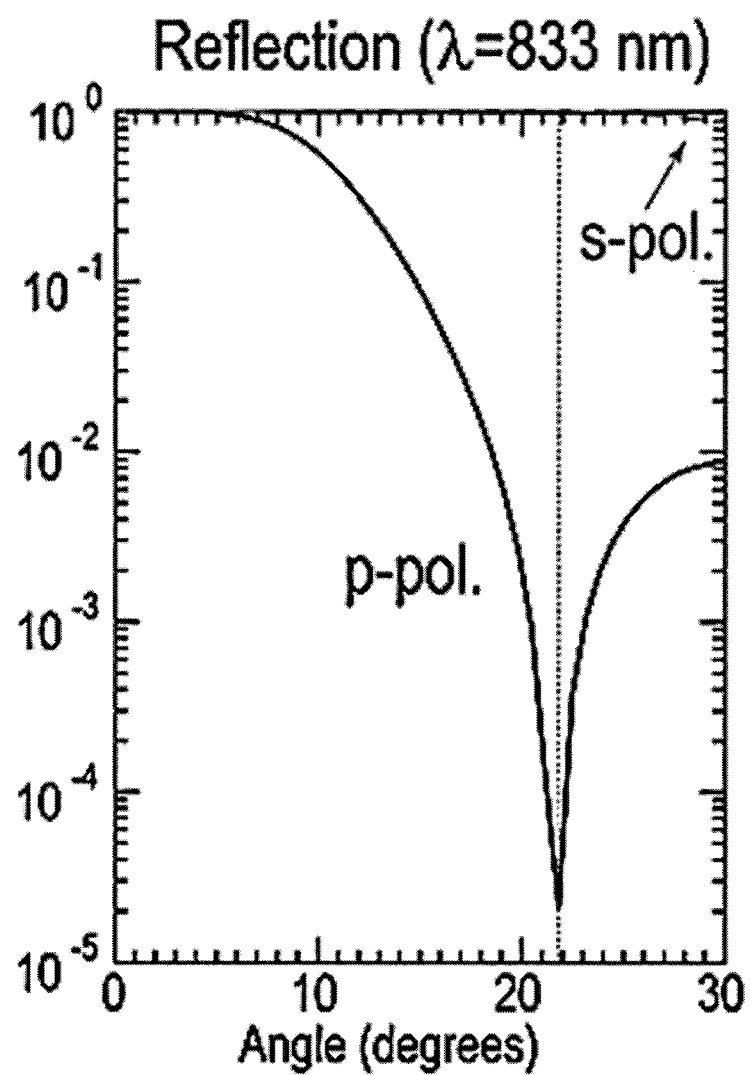
FIG. 11B is a plot of reflection in logarithmic scale as a function of angle (degrees) showing the simulated reflection by the polarization device according to various embodiments for both polarizations at about 833 nm wavelength.

FIG. 11A is a plot 1100a of reflection as a function of angle (degrees) showing the simulated reflection by the polarization device according to various embodiments for both polarizations at about 833 nm wavelength. FIG. 11B is a plot 1100b of reflection in logarithmic scale as a function of angle (degrees) showing the simulated reflection by the polarization device according to various embodiments for both polarizations at about 833 nm wavelength. FIGS. 11A and 11B demonstrate that similar performance results may be achieved for polarization devices with substrates, with reflection values <0.01% (transmission >99.98%) for p-polarized light and reflection >99.86% (transmission <0.14%) for s-polarized light (Extinction Ratio or ER of about $10^3$:1).

The same material may be used to obtain a polarizing element at telecommunication wavelengths. However, the dimensions of the polarization device may be required to be scaled.

Figure 12A:
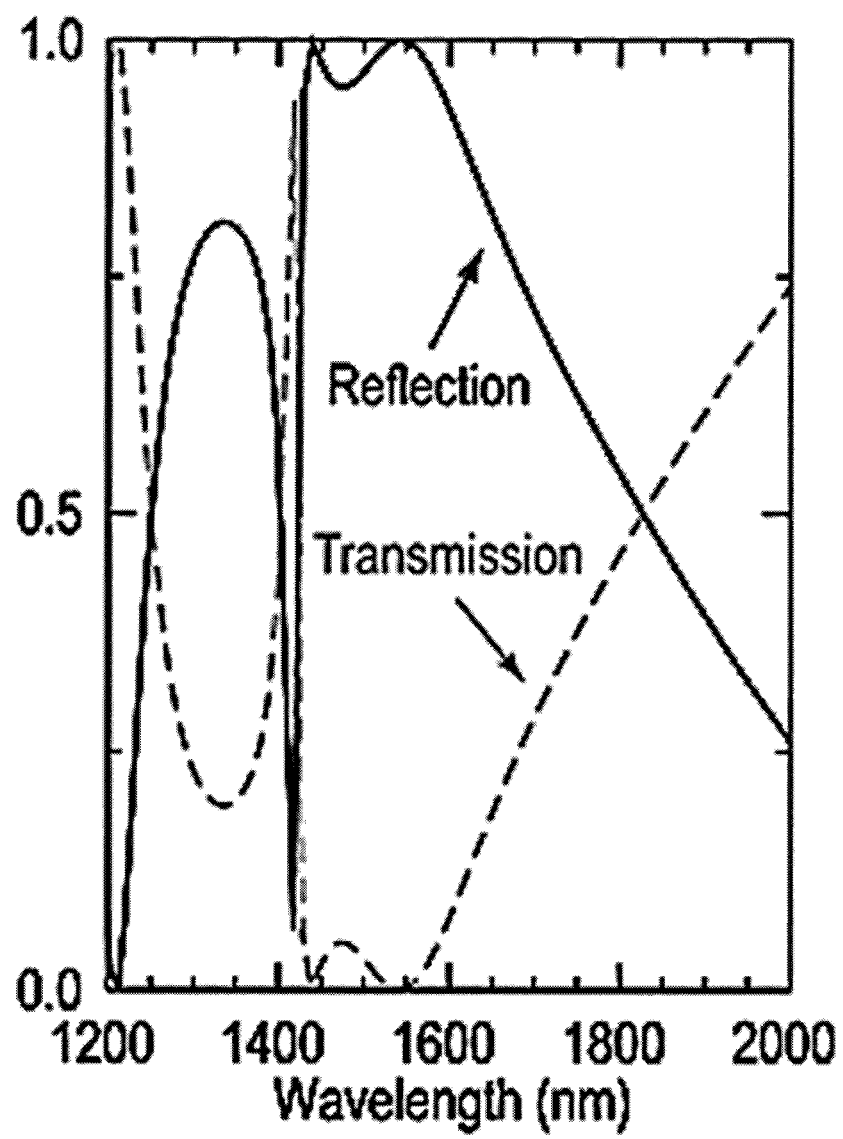
FIG. 12A is a plot of transmission/reflection as a function of wavelength (nanometers or nm) showing the stimulated transmission and reflection spectra of a polarization device with an array of nanodisks of period about 650 nm, diameter of about 500 nm and height of about 500 nm according under normal incidence illumination.
Figure 12B:
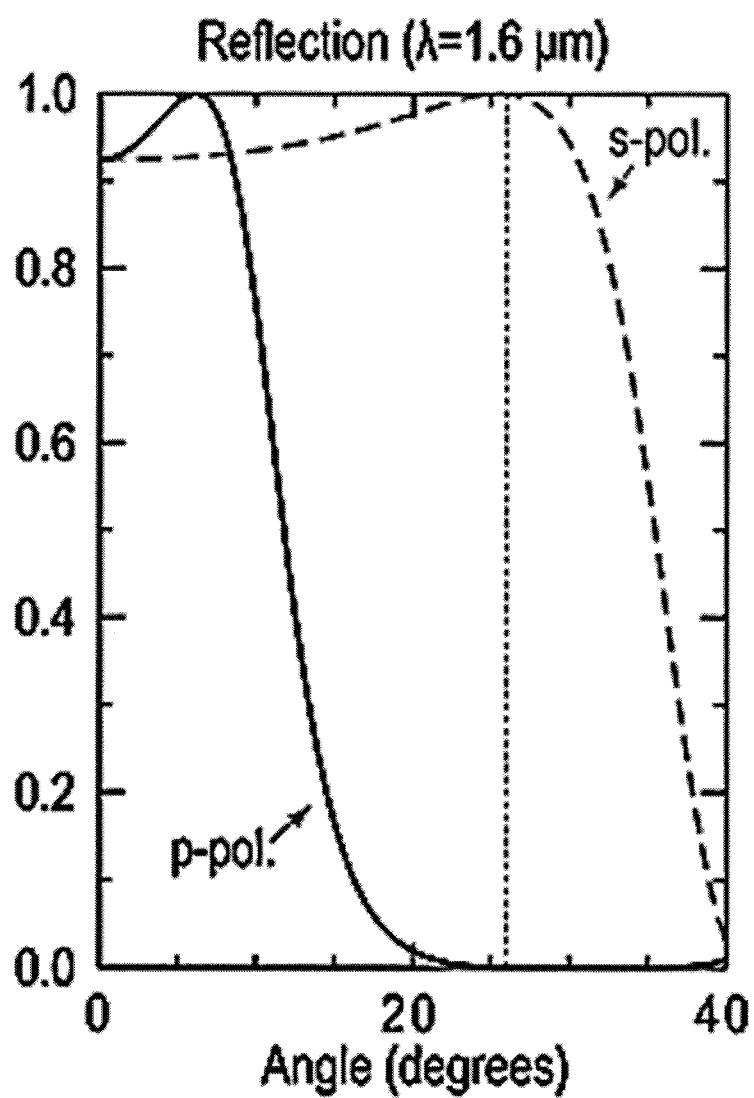
FIG. 12B is a plot of reflection as a function of angle (degrees) showing the stimulation of p-polarized and s-polarized plane electromagnetic waves at about 1.6 µm at various angles of incidence with the polarization device described in FIG. 12A according to various embodiments.

In one example, the operating wavelength may be set at ~1.6 μm wavelength and operation angles may be set about 20 degrees. The necessary dimensions of the disks may be changed to a diameter (D) of about 500 nm and height (H) of about 500 nm. The presence of substrate and superstrate may also be taken into account. The lattice period (P) may be accordingly scaled to about 650 nm. FIG. 12A is a plot 1200a of transmission/reflection as a function of wavelength (nanometers or nm) showing the simulated transmission and reflection spectra of a polarization device with an array of nanodisks of period about 650 nm, diameter of about 500 nm and height of about 500 nm according under normal incidence illumination. FIG. 12B is a plot 1200b of reflection as a function of angle (degrees) showing the simulation of p-polarized and s-polarized plane electromagnetic waves at about 1.6 μm at various angles of incidence with the polarization device described in FIG. 12A according to various embodiments. FIG. 12B shows a similar behaviour as that observed for the polarization devices designed to work at 833 nm, with a pronounced minimum of the p-polarized reflection, and a corresponding reflection peak in s-polarization at an incidence angle of about 26 degrees. The extinction ratio in this case may reach about $10^6$:1.

Figure 13A:
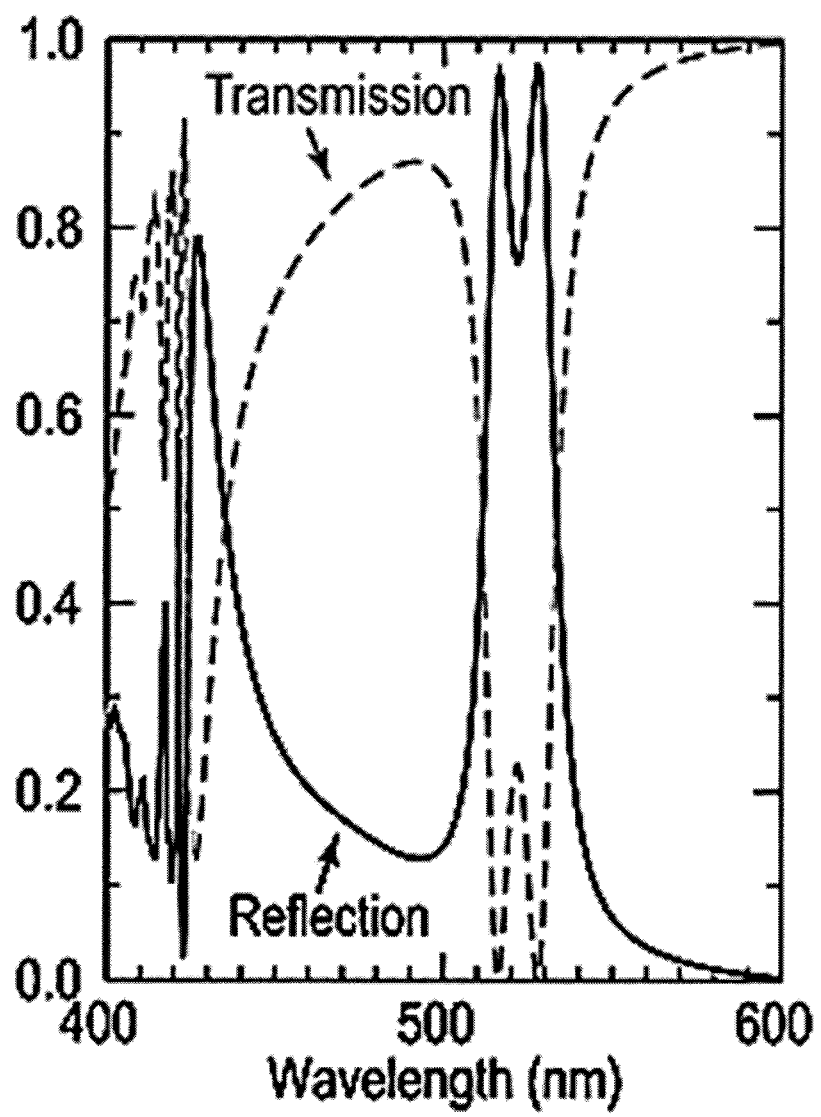
FIG. 13A is a plot of transmission/reflection as a function of wavelength (nanometers or nm) showing the stimulated transmission and reflection spectra of a polarization device with an array of nanodisks of period about 300 nm, diameter of about 250 nm and height of about 150 nm according under normal incidence illumination.
Figure 13B:
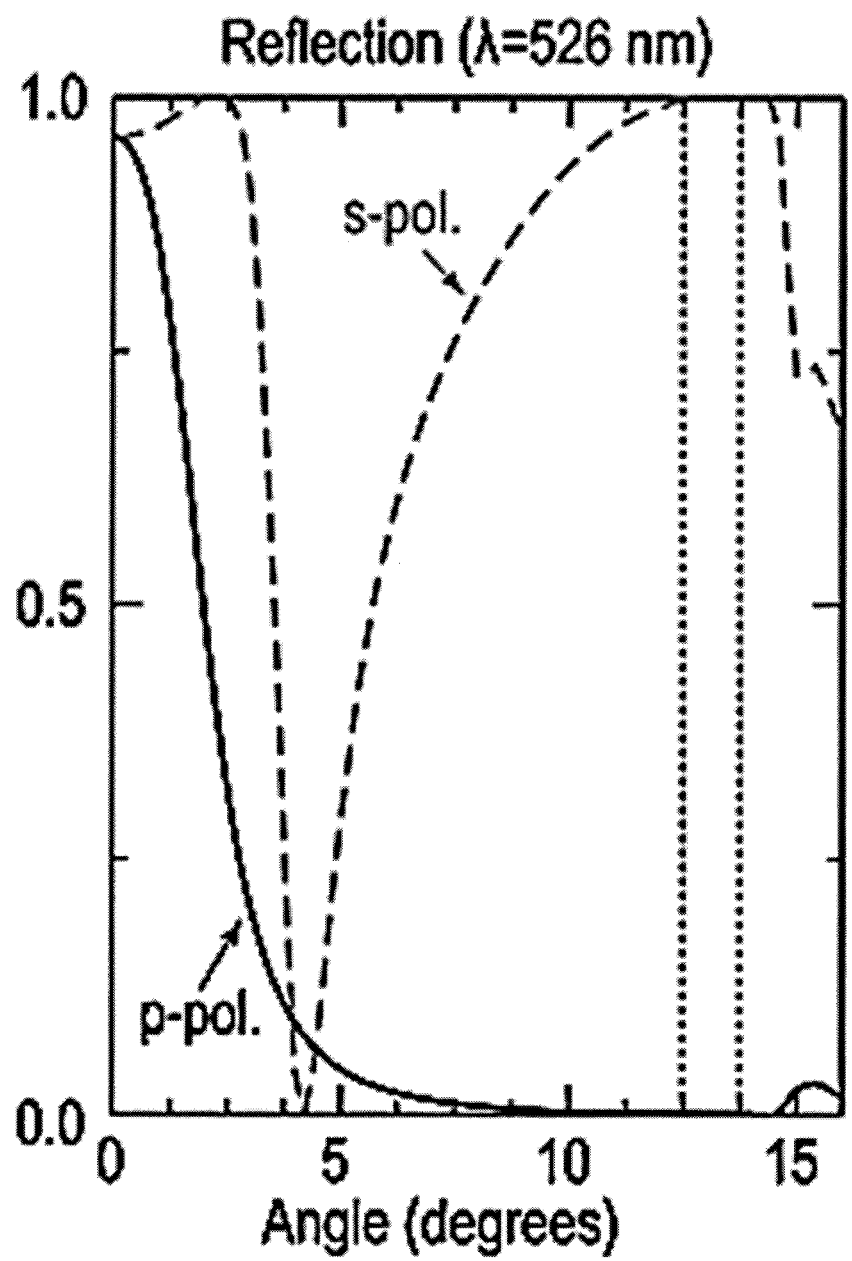
FIG. 13B is a plot of reflection as a function of angle (degrees) showing the stimulation of p-polarized and s-polarized plane electromagnetic waves at about 526 m at various angles of incidence with the polarization device described in FIG. 13A according to various embodiments.

In yet another example, a polarization device working at around 530 nm is also demonstrated. Silicon may not be the most appropriate material at this wavelength as silicon starts to strongly dissipate, absorbing a significant portion of the incident power due to the excitation of resonances within the particles at this wavelength. The nanodisks used may instead include titanium dioxide ($TiO_2$) as a suitable material at visible frequencies. As the $TiO_2$ refractive index (n about 2.6) is lower than that of Si, the resulting resonant wavelengths may be smaller compared to the physical size of the particles. In order to obtain the magnetic resonance at about 530 nm, the diameter (D) of the particles may be about 250 nm. Also, in order to have a good overlapping between the resonances, a different aspect ratio may be necessary. The height (H) may be changed to be about 150 nm (aspect ratio of about 5:3) to obtain the spectra shown in FIG. 13A. The gap may be reduced to about 50 nm only, since diffraction into the substrate and superstrate (considered as $SiO_2$) would need to be avoided. Diffraction may limit the range of operation incident angles to between about 0 degrees and about 20 degrees for wavelengths around the resonances. A working angle just below the diffraction limit is taken. FIG. 13A is a plot 1300a of transmission/reflection as a function of wavelength (nanometers or nm) showing the simulated transmission and reflection spectra of a polarization device with an array of nanodisks of period about 300 nm, diameter of about 250 nm and height of about 150 nm under normal incidence illumination. FIG. 13B is a plot 1300b of reflection as a function of angle (degrees) showing the simulation of reflection of p-polarized and s-polarized plane electromagnetic waves at about 526 m at various angles of incidence with the polarization device described in FIG. 13A according to various embodiments. FIG. 13B shows that the polarization device may work at about 526 nm and at about 13 to about 14 degrees (diffraction occurs at about 15.5 degrees) with an extinction ratio of about $10^4$:1. Interestingly, at about 4 degrees the polarization device shows a minimum in the s-polarization reflection. This may indicate a totally p-polarized beam in reflection. This effect may be a consequence of the inter-particle coupling due to their close proximity, which affects the modes induced in the particles. This effect may not be used, however, to obtain a polarizer beam splitter.

It may be possible to select the operating wavelengths and/or angles of incidence by changing the geometry and/or sizes of the polarizer elements. Further, the working principle of the polarization device may remain similar with a substrate and a cover layer.

Polarizing elements may be obtained or configured by designing them as described herein accordingly. Firstly, the desired polarization, wavelength and angle of operation may be selected. After the design parameters are chosen, a sub-diffractive array of elements for which electric dipoles and magnetic dipoles are induced may be designed. The induced dipoles may have amplitudes and phases such that radiation is cancelled in the reflection direction corresponding to the selected incidence angle and for the polarization opposite the desired polarization. In that way, the reflected wave may be purely polarized with the desired polarization. If polarizing beam splitter is desired, resonant elements may be used, in such a way that the selected polarization may be entirely reflected and the other purely transmitted.

Figure 14:
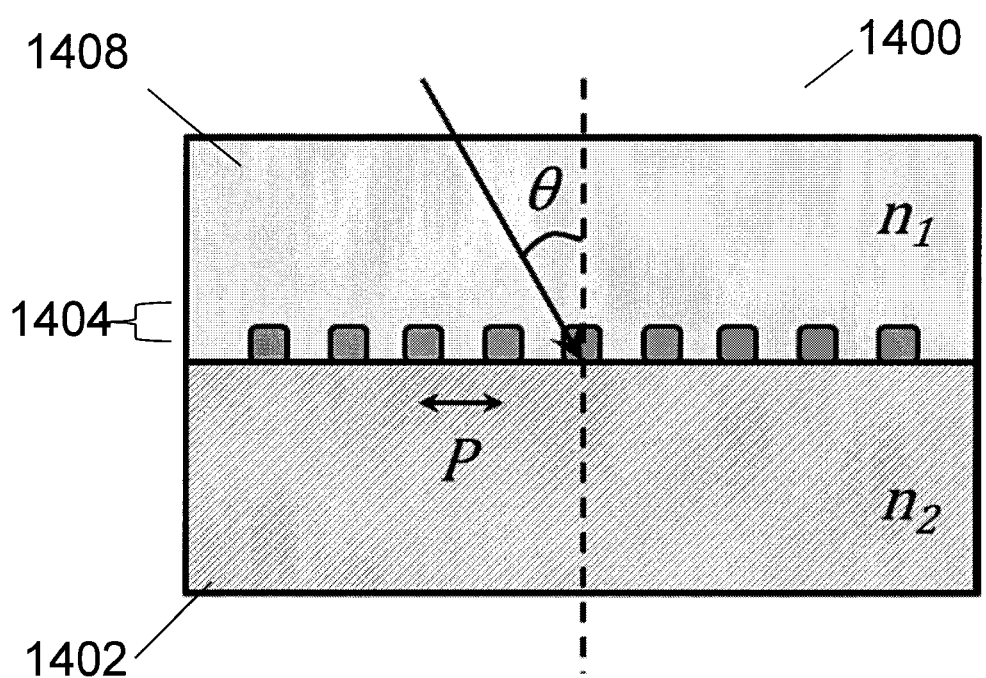
FIG. 14 shows a schematic of a polarization device according to various embodiments with the different designed parameters.
Figure 15A:
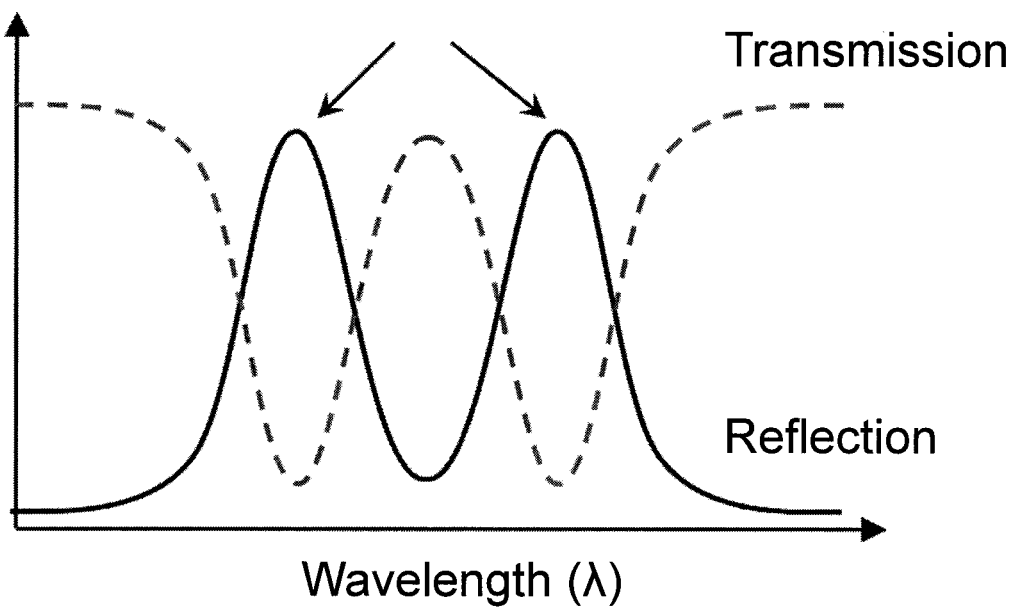
FIG. 15A is a plot of transmission/reflection as a function of wavelength (λ) showing the transmission and reflection spectra of the polarization device shown in FIG. 14 according to various embodiments.
Figure 15B:
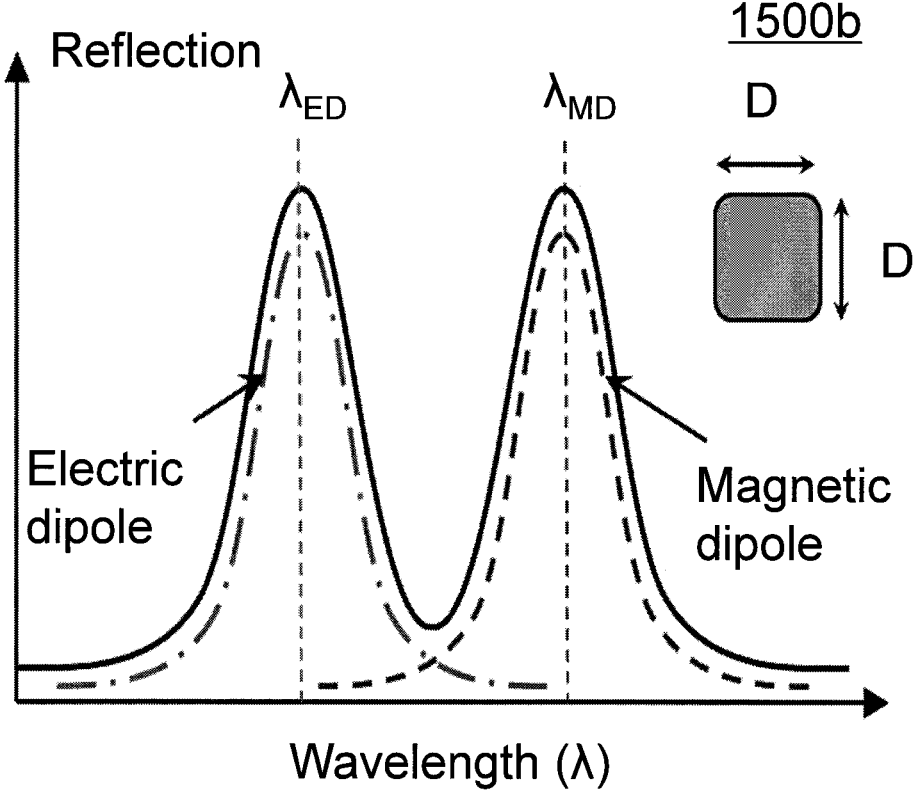
FIG. 15B is a plot of reflection as a function of wavelength (λ) showing the electric dipole resonance ($\lambda_{ED}$) and the magnetic dipole resonance ($\lambda_{MD}$) of a reflection spectrum of the polarization device according to various embodiments.
Figure 15C:
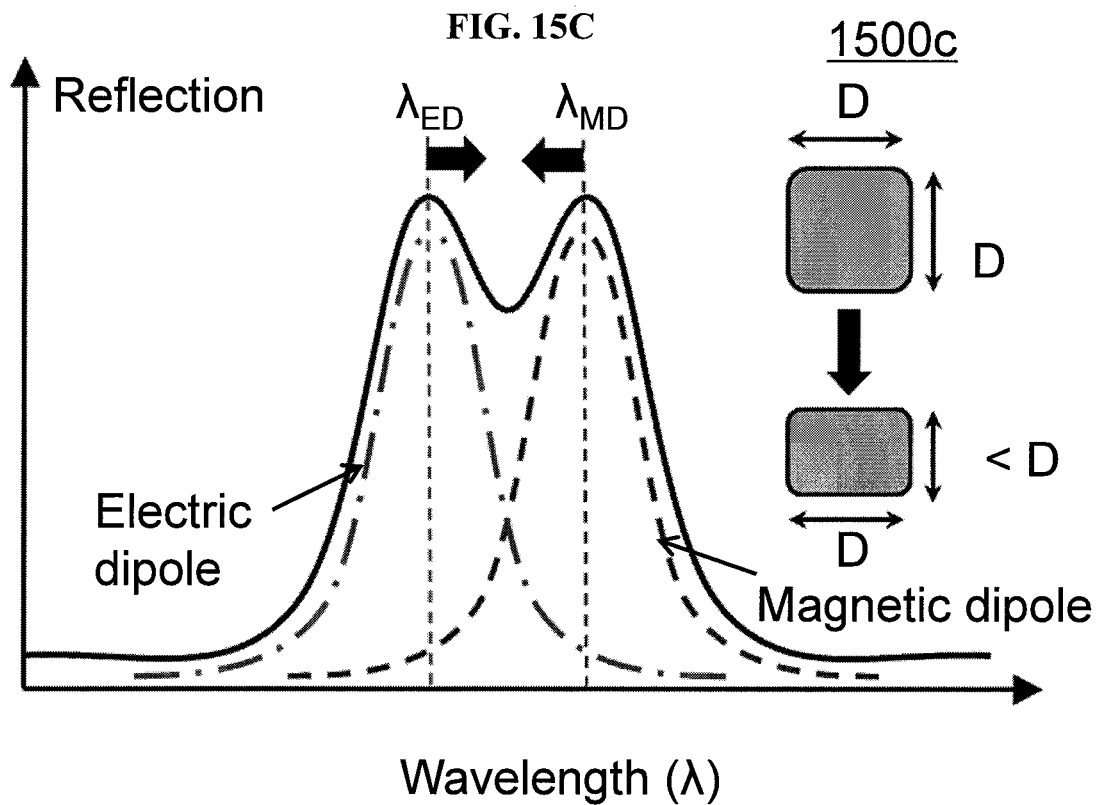
FIG. 15C is a plot of reflection as a function of wavelength (λ) showing the electric dipole and magnetic dipole resonances approach each other with the shrinking of one of the dimension of the polarizing elements of the polarizing device according to various embodiments.
Figure 15D:
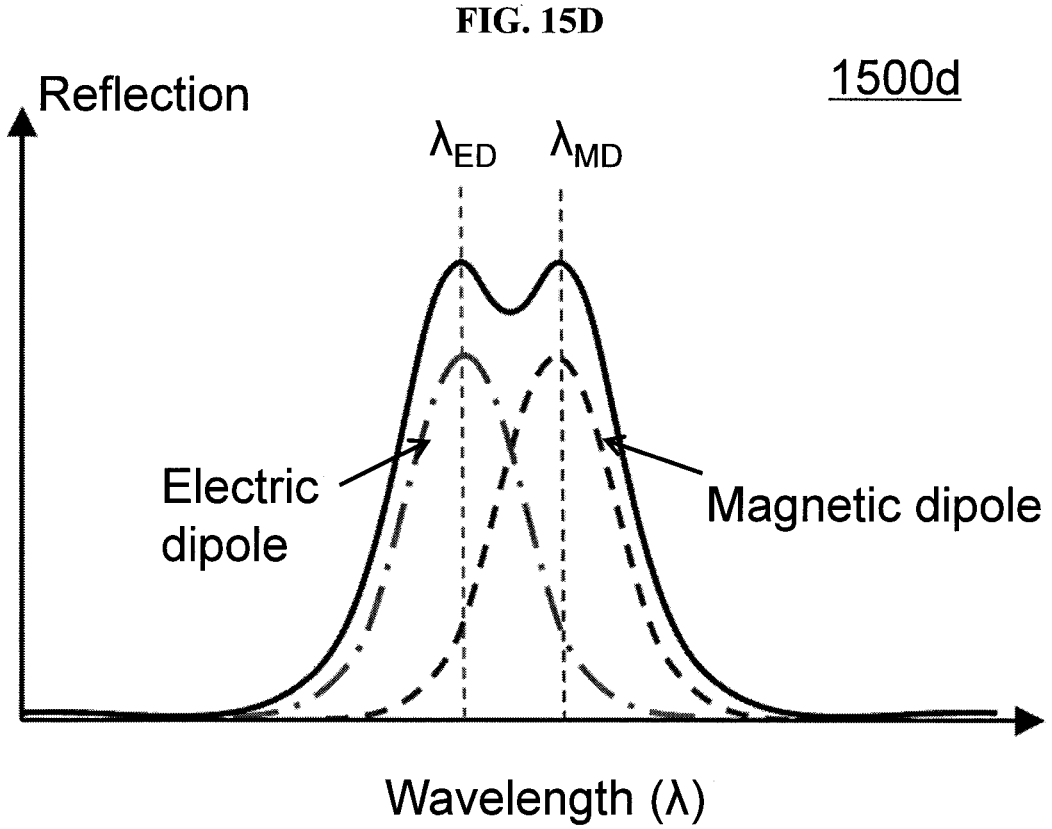
FIG. 15D is a plot of reflection as a function of wavelength (λ) showing the overlapping of the electric dipole and magnetic dipole resonances after the aspect ratio of the polarizing elements of the polarization device according to various embodiments have been changed.

Various embodiments may relate to a method on how the array of polarizing elements should be designed for operating polarizing elements operating at different wavelengths, polarizations and/or angles of incidence. FIGS. 14, 15A-N illustrate a method of configuring or designing a polarization device according to various embodiments. The polarization device may be configured or designed based on the following steps:

1. Select the desired wavelength, polarization and angle of incidence of operation.
2. FIG. 14 shows a schematic of a polarization device 1400 according to various embodiments with the different designed parameters. At the selected wavelength (λ) and angle of incidence (θ), the array 1404 may be designed such that no diffracted orders are supported. This rule sets an upper limit in the value of the array period (P). If $n_1$ is the refractive index of the superstrate 1408 and $n_2$ the refractive index of the substrate 1402, the period must fulfil, in the case of 0<θ<π/2:

$$P < \min\left[\frac{\lambda}{n_1(1+\sin\theta)}, \frac{\lambda}{n_2\left(1+\left(\frac{n_1}{n_2}\right)\sin\theta\right)}\right] \quad (1)$$

FIG. 15A is a plot 1500a of transmission/reflection as a function of wavelength (λ) showing the transmission and reflection spectra of the polarization device 1400 shown in FIG. 14 according to various embodiments.

3. The individual sub-wavelength elements in the array 1404 may be designed to obtain excitation of electric and magnetic dipole modes with minimum absorption at the desired wavelength in the following way:

(A) A suitable material may be selected in the wavelength range of interest. The material may have an refractive index with a large real part (e.g. Re(n)>2) and, a small imaginary part (e.g. Im(n)<<1). In the example of silicon at 833 nm as highlighted above, the value of the imaginary part may be Im(n)~0.002 and the associated absorption may be lower than 0.01%. Larger values of imaginary part may induce larger associated absorption, while lower values may make the absorption lower. Although this is not a necessary requirement to obtain the polarizing effect, it may be desirable in order to achieve larger damage thresholds.

(B) A convenient geometry may be chosen for fabrication. The resonances induced in the polarizing elements (also referred to as particles) at a desired wavelength may also be spectrally located.

(i) For particles with an aspect ratio (major dimension:minor dimension) of about 1:1 (e.g., a cube, a sphere or a disk with equal height and diameter) the wavelength at which the magnetic dipole resonance occurs ($\lambda_{MD}$) may, in good approximation be:

$$\lambda_{MD} \sim \text{Re}(n) \cdot D \quad (2)$$

where D is the size of the particle (e.g., the length of the side of the cube, the diameter of the sphere or the height or the diameter of the disk) and n the refractive index. The magnetic dipole resonance may correspond to the longest-wavelength dip in transmission or peak in reflection observed. FIG. 15B is a plot 1500b of reflection as a function of wavelength (λ) showing the electric dipole resonance ($\lambda_{ED}$) and the magnetic dipole resonance ($\lambda_{MD}$) of a reflection spectrum of the polarization device 1400 according to various embodiments.

(ii) For particles with an aspect ratio ~1:1, the electric dipole resonance may be the second resonance observed for decreasing wavelengths, i.e., its wavelength may be such that $\lambda_{ED} < \lambda_{MD}$. At shorter wave lengths additional resonances may appear.

(iii) Separated resonances may be identified as dips in the transmission or peaks in the reflection spectra of the array under normal incidence, as shown in FIG. 15B. Although not strictly necessary, there are additional tools that may allow a precise characterization of the modes excited within the particles. For example, it may be possible to perform a multipole decomposition technique based on full numerical simulations, which may provide a full description of the modes excited within the particles (amplitude and phases of the induced multipoles). If only experimental spectra are available, an approximate way to obtain this information may be to fit the total spectral shape in the region of interest as the sum of two resonances. The line shape of the resonances may be described by some appropriate function (usually a simple Lorentzian or a Fano line shape to allow some asymmetry in the profile) and its parameters may be retrieved through the mentioned fitting.

(iv) The lattice periods may be changed, keeping in view the limit as described in Equation (1), until the reflection spectrum at resonance gets as close as possible to unity. This may be generally obtained by reducing the lattice period, although there may be exceptions due to inter-particle interference. When inter-particle gaps are excessively small, resonances may be strongly altered, particularly at oblique incidence due to the emergence of coupling modes. This situation should be avoided as much as possible.

(v) The aspect ratio of the polarizing elements or particles may be changed to allow relative displacement of the resonances. Shrinking one of the dimensions of the polarizing elements (typically in the direction of incidence of the wave) may make the electric dipole and magnetic dipole resonances approach each other. The aspect ratio may be varied starting from an aspect ratio ~1:1. FIG. 15C is a plot 1500c of reflection as a function of wavelength (λ) showing the electric dipole and magnetic dipole resonances approach each other with the shrinking of one of the dimension of the polarizing elements of the polarizing device 1400 according to various embodiments. The dimension may be reduced from D to <D as shown in the inset of FIG. 15C. As an example, for polarizing element with refractive index n=3.5, the maxima position of resonances may coincide when the aspect ratio is about 2:1.

(vi) The aspect ratio of the polarizing elements may be changed to obtain overlapping resonances. FIG. 15D is a plot 1500d of reflection as a function of wavelength (A) showing the overlapping of the electric dipole resonances and magnetic dipole resonances after the aspect ratio of the polarizing elements of the polarization device 1400 according to various embodiments have been changed.

Figure 15E:
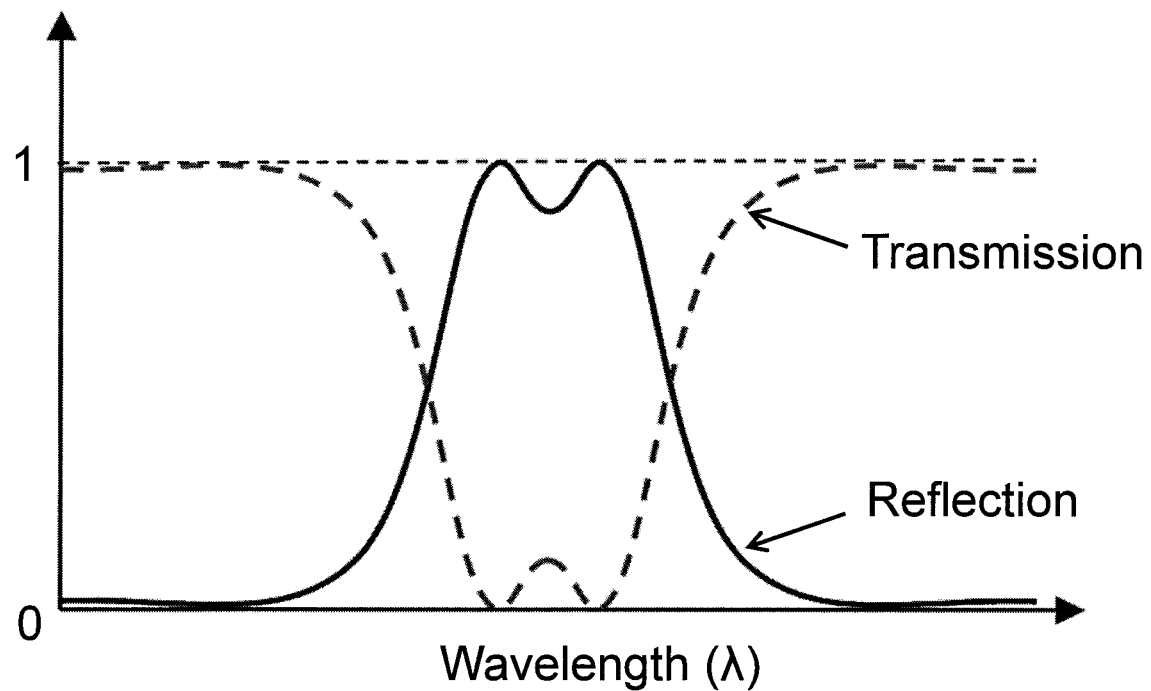
FIG. 15E is a plot of transmission/refection as a function of wavelength (λ) showing the reflection and transmission spectra of the polarization device according to various embodiments after optimization.

(vii) FIG. 15E is a plot 1500e of transmission/reflection as a function of wavelength (λ) showing the reflection and transmission spectra of the polarization device 1400 according to various embodiments after optimization.

Figure 15F:
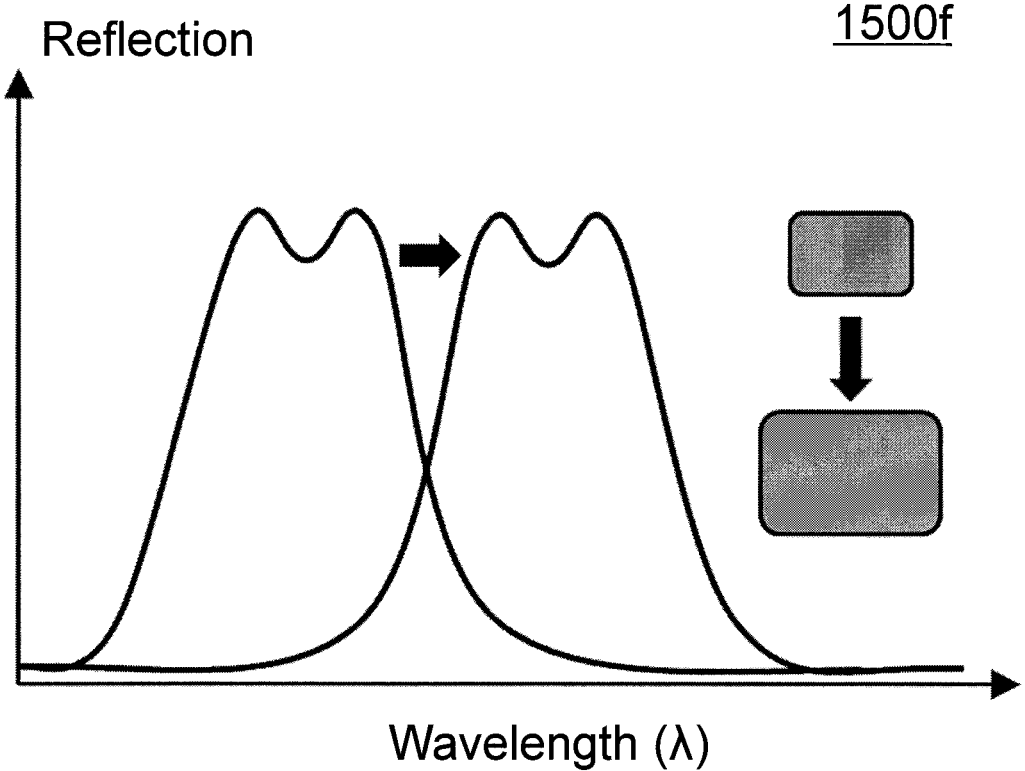
FIG. 15F is a plot of reflection as a function of wavelength (λ) showing the reflection spectrum of the polarization device according to various embodiments after the size of the polarization elements has been adjusted to shift the reflection spectrum to the desired wavelength.

(viii) The total size of the polarizing elements may be adjusted while keeping the aspect ratio constant to shift the spectrum to the desired wavelength. FIG. 15F is a plot 1500f of reflection as a function of wavelength (λ) showing the reflection spectrum of the polarization device 1400 according to various embodiments after the size of the polarization elements has been adjusted to shift the reflection spectrum to the desired wavelength.

4. The spectral position of the electric and magnetic resonances necessary to achieve polarizing behaviour for the polarization and angle of incidences desired at the selected wavelength may be determined.

(A) The following regarding polarization may be noted:

(i) If the polarization device 1400 is intended to transmit the p-polarization (and reflect the s-polarization), the electric dipole induced in the particles at the operation may radiate predominantly compared to the magnetic dipole. Any of the methods outlined in 3.B.iii may be applied by a precise characterization of the modes excited within the particles to determine whether if this condition is fulfilled or not. Alternatively, it may be possible to apply the following approximate rule: in spectral regions near the peak in reflection (or dip in transmission) at shorter wavelengths (corresponding to the electric dipole resonance) the electric dipole may dominate. Therefore, for operation in p-polarization, the desired wavelength of operation may fall within a close range of the electric dipole resonance peak.

Figure 15G:
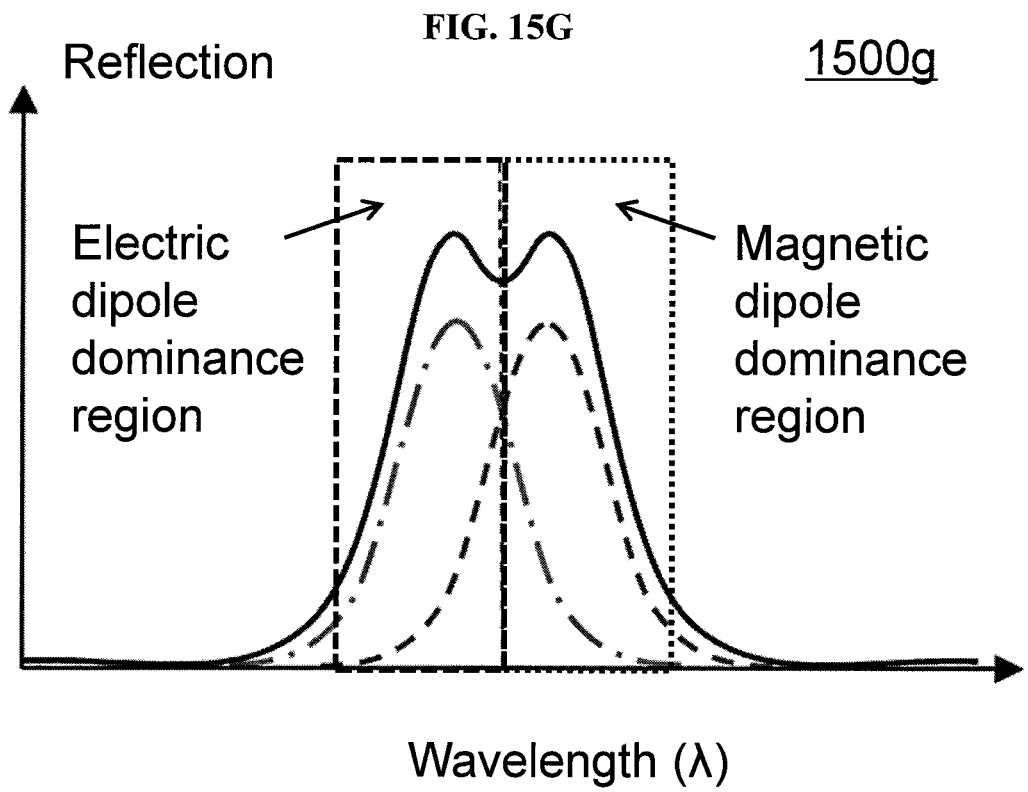
FIG. 15G is a plot of reflection as a function of wavelength (λ) showing the electric dipole dominance region and the magnetic dipole dominance region of the polarization device according to various embodiments.

(ii) If the polarization device 1400 is intended to transmit the s-polarization (and reflect the p-polarization), the opposite may hold: the magnetic dipole induced in the particles may radiate predominantly over the electric dipole. The spectral region may be located within a range around the peak in reflection (or dip in transmission) at longer wavelengths (corresponding to the magnetic dipole resonance). Therefore, for operation in s-polarization, the desired wavelength of operation may fall within a close range of the magnetic dipole resonance peak. FIG. 15G is a plot 1500g of reflection as a function of wavelength (λ) showing the electric dipole dominance region and the magnetic dipole dominance region of the polarization device 1400 according to various embodiments.

Figure 15H:
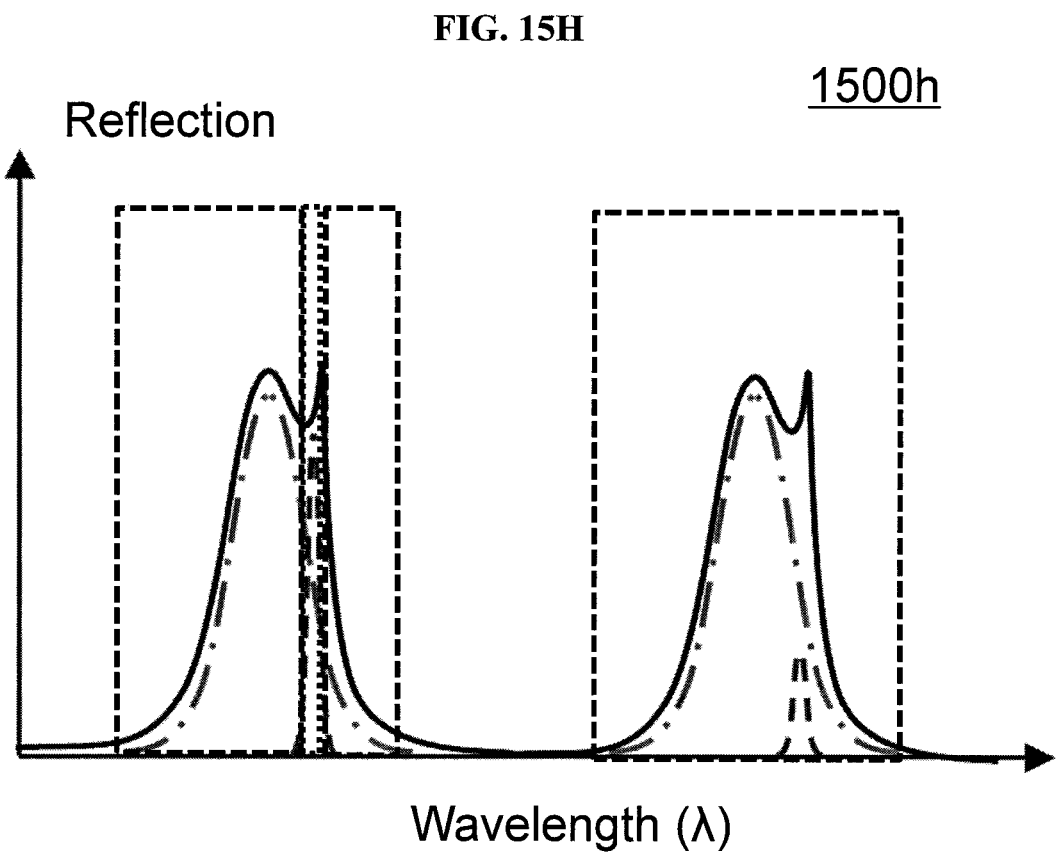
FIG. 15H is a plot of reflection as a function of wavelength (λ) showing a complex reflection spectrum of the polarization device according to various embodiments.
Figure 15I:
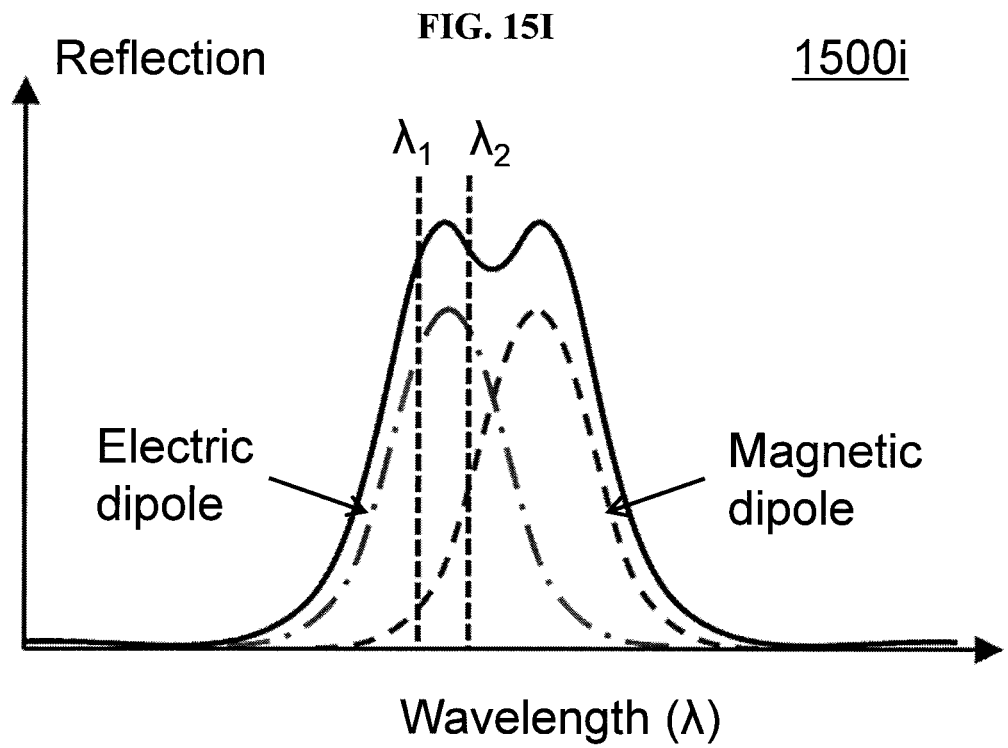
FIG. 15I is a plot of the reflection as a function of wavelength (λ) showing a reflection spectrum of a polarization device according to various embodiments with $\lambda_1 < \lambda_2$.
Figure 15J:
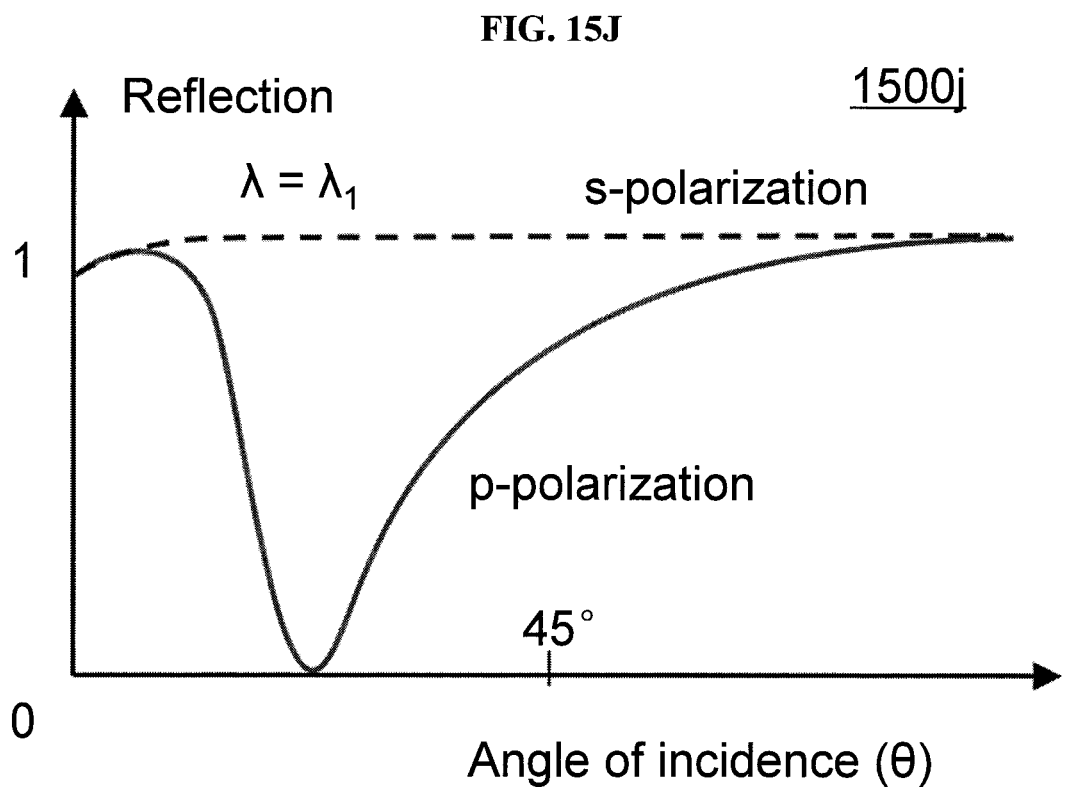
FIG. 15J is a plot of the reflection as a function of the angle of incidence (θ) of the polarization device showing a minimum in the p-polarization at $\lambda_1$.
Figure 15K:
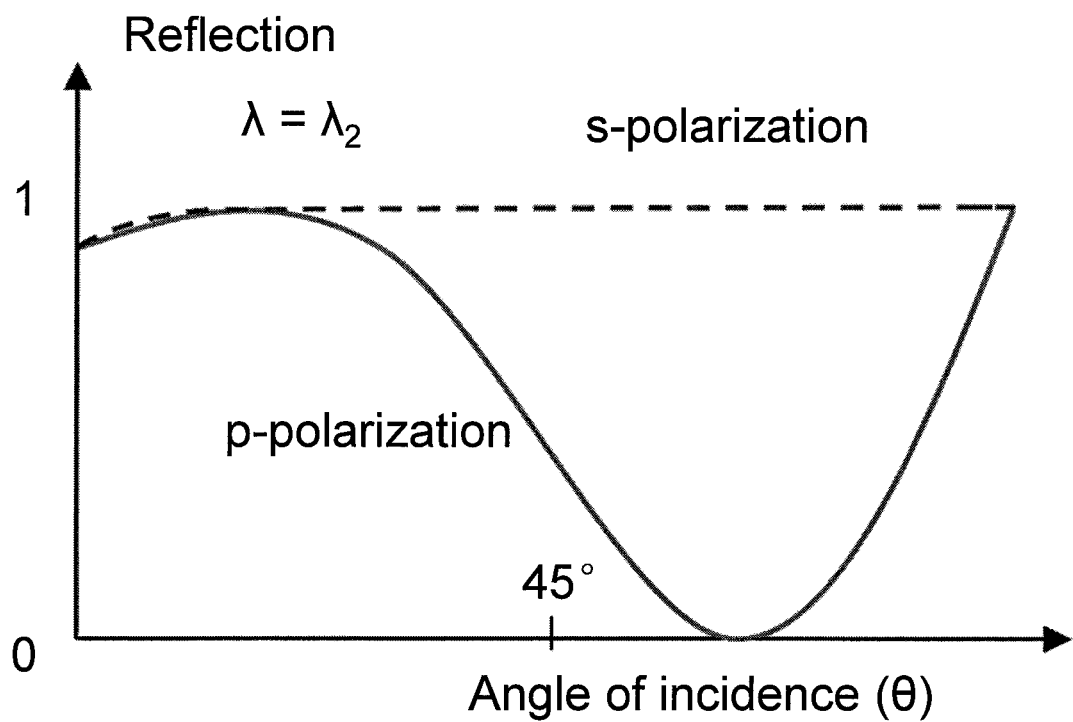
FIG. 15K is a plot of the reflection as a function of the angle of incidence (θ) of the polarization device showing a minimum in the p-polarization at $\lambda_2$.

(iii) The inter-particle interactions, certain geometries and material dispersion may present resonances with spectral line shapes giving rise to associated complex situations. FIG. 15H is a plot 1500h of reflection as a function of wavelength (λ) showing a complex reflection spectrum of the polarization device 1400 according to various embodiments. In these cases, in the absence of techniques providing information about the modes excited in the particles (such as those mentioned in 3.B.iii) a study of the angular reflection at particular wavelengths around the resonances may help to identify the width of the resonances (and thus the regions with predominance of electric dipole or magnetic dipole). The following prescription may be used:

If a minimum in the angular reflection is found in p-polarization at a given wavelength, the electric dipole may dominate at that wavelength. FIG. 15I is a plot 1500i of the reflection as a function of wavelength (λ) showing a reflection spectrum of a polarization device according to various embodiments with $\lambda_1 < \lambda_2$. FIG. 15J is a plot 1500j of the reflection as a function of the angle of incidence (θ) of the polarization device 1400 according to various embodiments showing a minimum in the p-polarization at $\lambda_1$. FIG. 15K is a plot 1500k of the reflection as a function of the angle of incidence (θ) of the polarization device 1400 according to various embodiments showing a minimum in the p-polarization at $\lambda_2$.

Figure 15L:
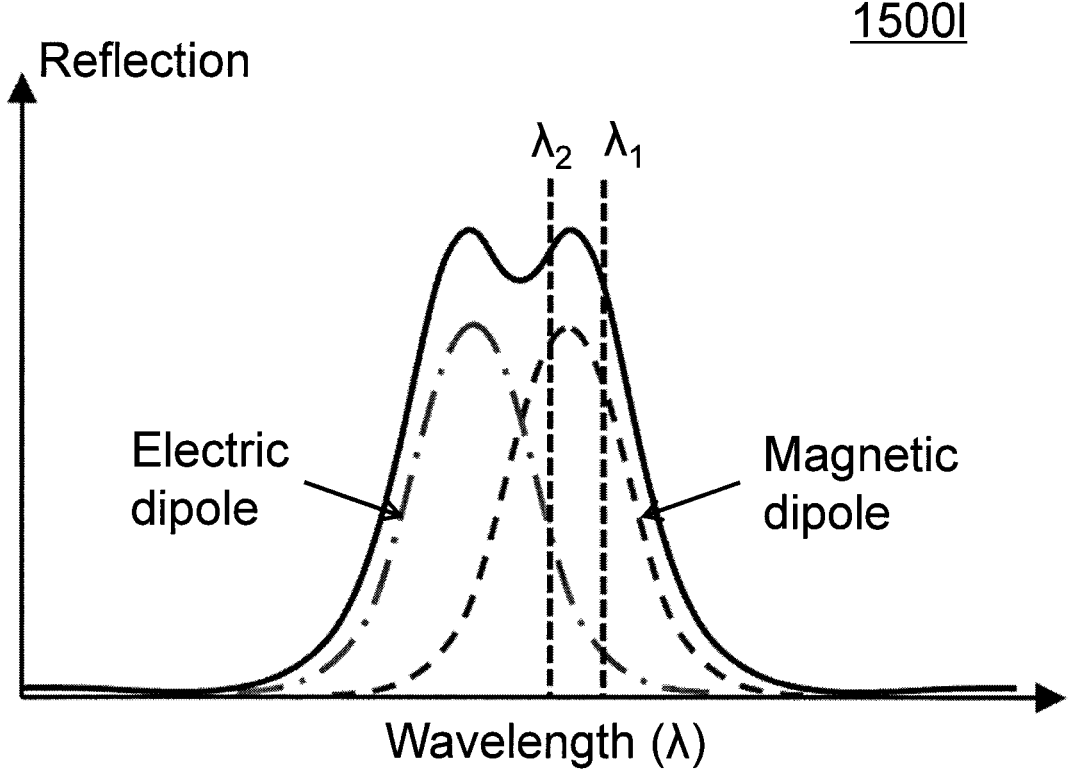
FIG. 15L is a plot of the reflection as a function of wavelength (λ) showing a reflection spectrum of a polarization device according to various embodiments with $\lambda_2 < \lambda_1$.
Figure 15M:
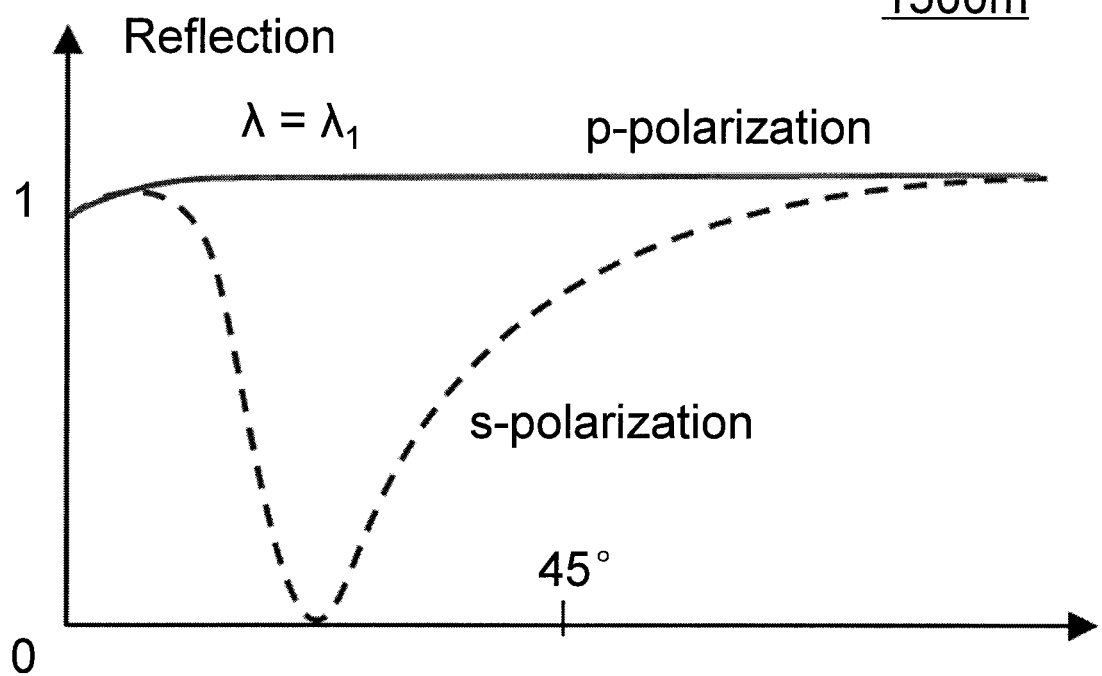
FIG. 15M is a plot of the reflection as a function of the angle of incidence (θ) of the polarization device showing a minimum in the s-polarization at $\lambda_1$.
Figure 15N:
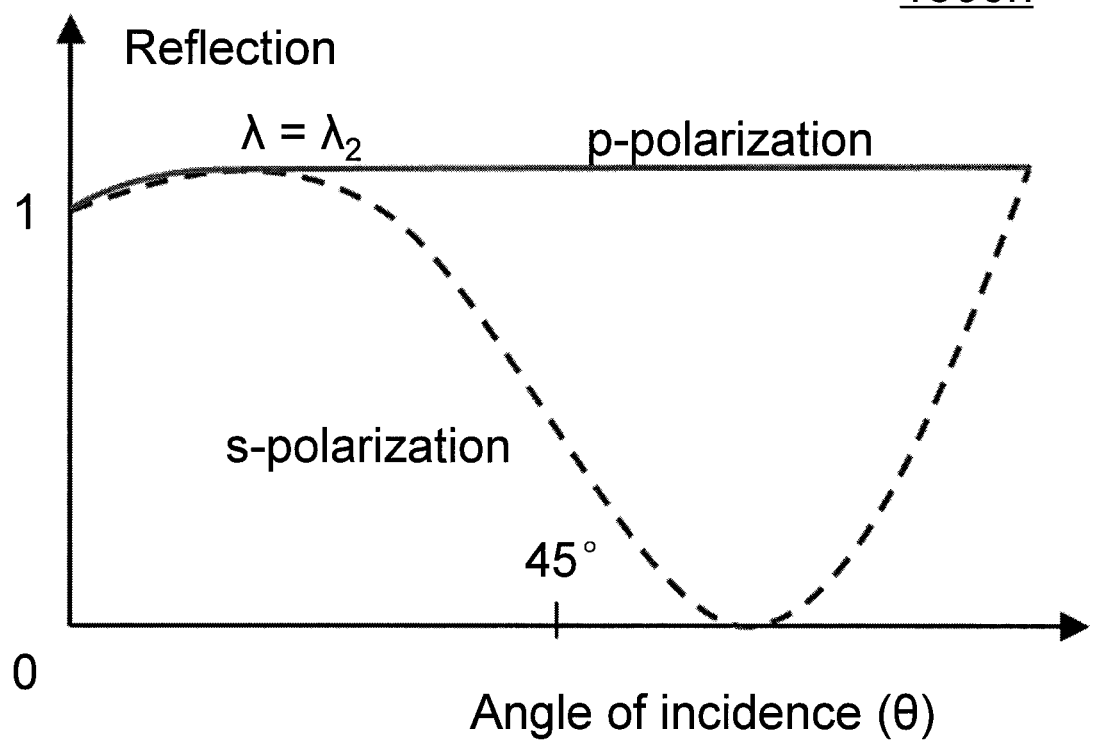
FIG. 15N is a plot of the reflection as a function of the angle of incidence (θ) of the polarization device showing a minimum in the s-polarization at $\lambda_2$.

If a minimum in the angular reflection is found in s-polarization at a given wavelength, the magnetic dipole may dominate at that wavelength. FIG. 15L is a plot 1500l of the reflection as a function of wavelength (λ) showing a reflection spectrum of a polarization device according to various embodiments with $\lambda_2 < \lambda_1$. FIG. 15M is a plot 1500m of the reflection as a function of the angle of incidence (θ) of the polarization device 1400 according to various embodiments showing a minimum in the s-polarization at $\lambda_1$. FIG. 15N is a plot 1500n of the reflection as a function of the angle of incidence (θ) of the polarization device 1400 according to various embodiments showing a minimum in the s-polarization at $\lambda_2$.

(B) The following regarding the angle of incidence may be noted:

(i) If the desired angle of incidence is smaller than 45°, the electric dipole moments and the magnetic dipole moments induced at the selected wavelength within the polarization device 1400 may oscillate in phase.

(ii) If the desired angle of incidence is greater than 45°, the electric dipole moments and the magnetic dipole moments induced at the selected wavelength within the polarization device 1400 may oscillate in anti-phase.

If the methods described in 3.B.iii are not present to provide information about the modes excited in the polarization elements, it may be possible to identify the spectrum region fulfilling 4.B.i and 4.B.ii from the reflection spectrum of the polarization device under normal incidence based on the following:

In the spectral regions located either at shorter wavelengths with respect to the maxima of the electric dipole resonance, or longer wavelengths with respect to the maxima of the magnetic dipole moment, the dipoles may be approximately in phase (see FIGS. 15J, 15M where $\lambda = \lambda_1$). In other words, this may hold when operating at shorter wavelengths with respect to the maxima of both resonances, or at longer wavelengths compare to the maxima of both resonances.

In the spectral regions located between the maxima of the electric dipole resonance and the maxima of the magnetic dipole moment, the dipoles may be approximately be in phase (see FIGS. 15K, 15N where $\lambda = \lambda_2$). In other words, this may hold when operating in the spectral region situated between the maxima of the two resonances.

Close inter-particle distances (e.g. distances about λ/10) may lead to alterations of the position and shape of the resonances under oblique incidence, making the previous rules less accurate. In such circumstances, a more exhaustive study of the reflection spectra as a function of incidence and wavelength may be required.

(iii) The specific angle of incidence at which reflection is suppressed may be determined by the ratio of amplitudes to the induced dipole moments. The ratio needed may be approximately equal to the cosine of twice the incidence angle. In the absence of techniques providing information about the modes excited in the particles, the following rules may be applied:

Angles close to 45 degrees may be obtained for wavelengths close to the resonance maxima.

Smaller or larger angles may be obtained departing from that spectral position within the ranges specified in 4.B.i. and 4.B.ii.

The application of the set of rules given above may allow the design of the array of polarization elements for which the polarizing effect is obtained at any desired wavelength, polarization and/or angle of incidence. The procedure may be as follows:

(i) Apply the rules as described herein until angular reflection curves similar to those shown in FIG. 15J-K or FIG. 15M-N are obtained for any wavelength close to that desired wavelength (i.e., at this stage the precise wavelength may be unimportant) and the desired polarization. The curves may differ from those except in the surroundings of the desired angle of incidence.

(ii) Adjust the geometry of the polarization elements applying the simple scaling rules given (in particular 3.B.viii.) to shift the spectrum so that the polarizing effect occurs at the precise desired wavelength.

Limitations may exist regarding the polarizing effect:

(i) If the resonances are not strong enough as to make reflection 100% at the desired wavelength, the polarization device may only be used as a polarizer (not a polarizing beam splitter).

(ii) If one of the resonances is weaker than the other in the whole spectral range (a situation such as that depicted in FIG. 15H), the polarizing effect may only be obtained in the corresponding polarization.

(iii) The maximum angle of incidence may be fixed by the combination of period, external indices of substrate as well as superstate, particle size, and/or refractive index based on the the following:

$$\theta < \min\left[\operatorname{asin}\left(\frac{nD}{n_1 P} - 1\right), \operatorname{asin}\left(\frac{nD}{n_1 P} - \frac{n_2}{n_1}\right)\right] \quad (3)$$

The resonant wavelength of the magnetic dipole may be required to be smaller than the wavelength of the first diffracted order in reflection and transmission.

Various embodiments may provide designs of polarizing elements such as polarizers or polarizing beam-splitters. The polarizing elements may be or may include sub-wavelength sized single or multiple particles supporting electric and magnetic dipole resonances arranged in sub-diffractive arrays. The desired polarization (from an unpolarized wave) may be obtained in the reflected wave based on almost perfect transmission (or close to zero reflection) of the perpendicular polarization. The zero reflection may be a consequence of destructive radiation interference from the dipoles induced in the particles in that direction. The use of resonant particles may allow also a highly efficient reflection of the desired polarization, which may also make the transmitted beam polarized as well. Further, this may also allow the polarization device to be used as a polarizer and/or a polarizing beam splitter with figures-of-merit comparable to state-of-the-art commercial technologies. The polarization device may intrinsically be designed with sub-wavelength thickness, which allows their use in situations in which technologies based on bulk elements cannot be employed, such as ultra-compact devices or for short pulse polarization. Appropriate choice of materials, together with appropriate shaping and sizing of the constituent particles may allow the choosing of the working wavelength, polarization and angle of incidence.

Various embodiments may have intrinsically sub-wavelength thickness. Various embodiments may be used as a component in ultra-compact devices and/or for short pulse propagation. Various embodiments may be able to achieve polarization with addition of a degree of freedom associated with the magnetic response. As a consequence, various embodiments may allow tailoring not only the operating wavelength, but also the angle of incidence and/or selecting the polarization that is reflected and/or transmitted.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A polarization device for polarizing electromagnetic waves, the device comprising:
   a stacked arrangement comprising:
      a medium; and
      an antireflection coating in contact with the medium; and
   a periodic array of polarization elements in contact with the medium;
   wherein the polarization device is configured to, based on an electric dipole resonance and a magnetic dipole resonance of the periodic array of the polarization elements, transmit first polarized electromagnetic waves having a first polarization, and reflect second polarized electromagnetic waves having a second polarization upon receiving the electromagnetic waves.

2. The polarization device according to claim 1,
   wherein the medium is a substrate;
   wherein the substrate comprises at least one selected from a group consisting of a semiconductor material and a dielectric material; and
   wherein a refractive index of the substrate is lower than a refractive index of the polarization elements.

3. The polarization device according to claim 2,
   wherein the refractive index of the substrate is any value between 1 and 2, and the refractive index of the polarization elements is any value greater than 2.

4. The polarization device according to claim 1,
   wherein the polarization elements are structures with a shape selected from a group consisting of spheres, cylinders, discs, spheres, parallelepipeds, cones, ellipsoids, and prisms.

5. The polarization device according to claim 1,
   wherein the array is arranged in a Bravais lattice.

6. The polarization device according to claim 1,
   wherein the polarization elements comprise silicon or titanium oxide.

7. The polarization device according to claim 1, further comprising:
   a cover layer covering the periodic array of polarization elements.

8. The polarization device according to claim 1, further comprising:
   wherein the first polarization is orthogonal to the second polarization.

9. The polarization device according to claim 1,
   wherein the electromagnetic waves are laser pulses.

10. The polarization device according to claim 9,
   wherein each laser pulse has a duration of any one value above 10 fs.

11. An arrangement comprising:
   a source for emitting electromagnetic waves; and
   a polarization device for polarizing the electromagnetic waves, the polarization device comprising:
      a stacked arrangement comprising:
         a medium; and
         an antireflection coating in contact with the medium; and
      a periodic array of polarization elements in contact with the medium;
   wherein the polarization device is configured to, based on an electric dipole resonance and a magnetic dipole resonance of the periodic array of polarization elements, transmit first polarized electromagnetic waves having a first polarization, and reflect second polarized electromagnetic waves having a second polarization upon receiving the electromagnetic waves.

12. A method of forming a polarization device for polarizing electromagnetic waves, the method comprising:
   forming a stacked arrangement comprising:
      a medium; and
      an antireflection coating in contact with the medium; and
   forming a periodic array of polarization elements in contact with the medium;
   wherein the polarization device is configured to, based on an electric dipole resonance and a magnetic dipole resonance of the periodic array of the polarization elements, transmit first polarized electromagnetic waves having a first polarization and to reflect second polarized electromagnetic waves having a second polarization upon receiving the electromagnetic waves.

13. A method of operating a polarization device for polarizing electromagnetic waves, the method comprising:
   arranging a polarization device to receive the electromagnetic waves, the polarization device comprising:
      a stacked arrangement comprising:
         a medium; and an antireflection coating in contact with the medium; and a periodic array of polarization elements in contact with the medium;

wherein the polarization device is configured to, based on an electric dipole resonance and a magnetic dipole resonance of the periodic array of the polarization elements, transmit first polarized electromagnetic waves having a first polarization and to reflect second polarized electromagnetic waves having a second polarization upon receiving the electromagnetic waves.

14. The method according to claim 13, wherein the first polarization is p-polarization and the second polarization is s-polarization when the electric dipole resonance is greater than the magnetic dipole resonance.

15. The method according to claim 13, wherein the first polarization is s-polarization and the second polarization is p-polarization when the magnetic dipole resonance is greater than the electric dipole resonance.

16. The method according to claim 13, wherein the electromagnetic waves are incident onto the polarization device at an angle of incidence.

17. The method according to claim 16, wherein the angle of incidence is smaller than 45°; and wherein electric dipole moments induced in the polarization elements oscillate in phase with magnetic dipole moments induced in the polarization elements.

18. The method according to claim 16, wherein the angle of incidence is greater than 45°; and wherein electric dipole moments induced in the polarization elements oscillate in anti-phase with magnetic dipole moments induced in the polarization elements.

19. The method according to claim 13, wherein the electromagnetic waves are unpolarized.

20. The method according to claim 19, wherein the polarization device is configured to transmit the first polarized electromagnetic waves having the first polarization and to reflect the second polarized electromagnetic waves having the second polarization, based on a group of parameters comprising a period of the array, a shape of the array, a material of the polarization elements, and dimensions of the polarization elements.

* * * * *